(12) United States Patent
Tsai

(10) Patent No.: US 6,812,452 B2
(45) Date of Patent: Nov. 2, 2004

(54) APPARATUS AND METHOD FOR MEASURING THE WAVELENGTH OF LIGHT PRESENT IN A LIGHT BEAM

(75) Inventor: John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 61 days.

(21) Appl. No.: 10/286,701

(22) Filed: Oct. 31, 2002

(65) Prior Publication Data

US 2003/0057351 A1 Mar. 27, 2003

Related U.S. Application Data

(63) Continuation-in-part of application No. 09/798,449, filed on Mar. 1, 2001.
(60) Provisional application No. 60/241,569, filed on Oct. 18, 2000.

(51) Int. Cl.[7] .................................................. G01J 3/50
(52) U.S. Cl. ...................................... 250/226; 356/477
(58) Field of Search ...................... 372/29.01–29.33, 372/38.01–38.07; 250/226; 356/477, 491, 496, 506, 519–521; 398/183–187, 195–196

(56) References Cited

U.S. PATENT DOCUMENTS 4,985,624 A * 1/1991 Spillman, Jr. ............ 250/237 G
6,560,252 B1 * 5/2003 Colbourne et al. ............ 372/32

* cited by examiner

*Primary Examiner*—Stephone B. Allen
*Assistant Examiner*—Patrick J. Lee
(74) *Attorney, Agent, or Firm*—Raymond E. Roberts; Intellectual Property Law Offices

(57) ABSTRACT

A light wavelength meter (10) able to accept light into a light diverter (16) and impart to it a transverse displacement characteristic which can be detected in a light detection unit (20) connected to a processor (22). Optionally, a light diverger (18) may be provided to enhance angular resolution. The light diverter (16) and the light diverger (18) may either transmit or reflect the light. The light diverter (16) may include a diffraction grating (116, 156), Fabry-Perot interferometer (216), multiple slit plate (316), or an acousto-optical unit (416). The processor (22) may employ wavelength data look-up tables, including addressed based on light intensity and the first defivative of light intensity.

34 Claims, 12 Drawing Sheets

$$\frac{I}{I_0} = \left[\frac{\sin a}{a}\right]^2 * \left[\frac{\sin(N*b)}{\sin b}\right]^2$$

APPARATUS AND METHOD FOR MEASURING THE WAVELENGTH OF LIGHT PRESENT IN A LIGHT BEAM

CROSS-REFERENCE TO RELATED APPLICATIONS

This is a continuation-in-part of application Ser. No. 09/798,499, filed Mar. 1, 2001, which claims the benefit of U.S. Provisional Application No. 60/241,569, filed Oct. 18, 2000.

TECHNICAL FIELD

The present invention relates generally to methods and apparatus for using, controlling and detecting radiant energy, and more particularly to light wavelength determination. It is anticipated that the present invention will be employed widely in the calibration of light wavelength and the stabilization of light frequency, particularly in the telecommunications industry, but the invention is also well suited for use in laboratory measurement and in many other industries.

BACKGROUND ART

The ability to measure the wavelength or frequency (herein treated as equivalent with both meant when either term is used) of light is highly useful in industry and basic research. The telecommunications industry provides an excellent example, and will be used as the one herein. One brief discussion of the need for this capability in telecommunications can be found in REIZEMAN, "Optical Nets Brace for Even Heavier Traffic," IEEE Spectrum, January 2001, pg. 44–46, discussing the growth of wavelength-division multiplexing (WDM) for communications. This article explains how WDM has grown to 160 wavelength systems today and opines that 320 wavelength systems will be available within one year. It also covers the difficulty of combining and separating light wavelengths, and tunable laser systems are identified as a critical need to make such systems economical and reliable.

Numerous systems exist to measure wavelength or frequency in some manner, these suffer from a number of limitations. Some permit only relative measurement, requiring reliance on a reference standard rather than directly on a principle of physics, and usually also requiring reliance on the system to stay in calibration for some period of time after the reference is removed. Other systems have limited measurement resolution. Still others have complex principles of operation: requiring moving or complex parts, which typically are expensive; or requiring multiple passes through at least part of the optics. In fact, most prior art systems suffer from combinations of these, and summaries of some such systems follow.

U.S. Pat. No. 5,233,405 by Wildnauer et al. teaches a double pass scanning monochromator for use in optical spectrum analysis. It employs a diffraction grating and slit, a motor for rotating the diffraction grating, and a shaft angle encoder for sensing the grating position. As such, the scanning monochromator is a complex apparatus including moving parts for the analysis of a full light spectrum.

U.S. Pat. No. 5,748,310 by Fujiyoshi teaches a spectrum separation apparatus able to generate an output beam having a specific wavelength from a multi-wavelength input beam. An input beam is focused on a diffraction grating to generate a number of diffracted component beams, of which one having a specific wavelength is directed to an output slit. As such, this reference merely addresses spectrum separation, albeit using a diffraction grating and other optical components to achieve this, but it is not otherwise particularly relevant.

U.S. Pat. No. 5,331,651 by Becker et al. teaches a wavelength adjusting system in which a selective filter element, such as a Fabry-Perot etalon, is arranged on a shaft and can be rotated by a motor. When the shaft is rotating, the angle of incidence of a light beam on the filter changes, resulting in a change of the wavelength of the transmitted beam and small changes of the angle of incidence and thus of the wavelength can be adjusted. As such, this system also employs physically moving sub-systems which are difficult to set up, calibrate, and maintain.

U.S. Pat. No. 5,509,023 by Glance et al. teaches a laser tuning system employing a Fabry-Perot resonator and an optical frequency routing device and photodetector system to detect a particular Fabry-Perot resonant frequency to which the laser is tuned. The optical frequency routing device includes a plurality of unequal length input and output waveguides and an optical grating.

U.S. Pat. No. 6,094,271 by Maeda teaches a wavelength measuring system which includes two wavelength dispersion elements (diffraction gratings or prisms) and a right-angle reflecting prism which divides the parallel light rays from the second wavelength dispersion element into two reflected light beams. Two optical receivers then receive the reflected light beams from the right-angle reflecting prism, respectively, and signals from the first and second optical receivers are processed to determine wavelength. As such, this approach uses two gratings or prisms to spectrally disperse the light, the two-reflective surfaces of the right-angle reflecting prism, and two sensors. The gratings or prisms require alignment there between, as well as alignment in relation to the right-angle reflecting prism.

U.S. Pat. No. 5,796,479 by Derickson et al. teaches a detector array spectrometer which simultaneously monitors wavelength, power, and signal-to-noise ratio of wavelength division multiplexed (WDM) channels. A spectrometer formed by a diffraction grating, mirror, and waveplate spatially separates signals from the channels according to wavelengths. The separated signals are then directed incident on an array of split-detectors and noise detectors. As such, this double-pass apparatus directs the light beam onto the diffraction grating, through the waveplate, reflects it off the mirror, back through the waveplate, again onto the diffraction grating, and then onward into splitter and detection components.

U.S. Pat. No. 5,898,502 by Horiuchi et al. teaches an optical wavelength monitoring apparatus. An optical filter is used which maximizes transmittance at a specific wavelength. The transmittance is detected by a photodiode and logarithmic-amplified. The optical filter 24 is an optical element whose transmittance decreases as the incident light deviates from a specific wavelength. As such, this is an enviably simple system. Unfortunately, however, the transmittance of its optical filter is too wavelength specific. That is to say that it is useful for locking to a specific frequency but not so useful for measuring what wavelength is present. It can determine the nature of frequency drift, upward or downward in frequency, but by use of an assembly of plural unequal length waveguides and photodiodes. The amplification and other processing then is substantial.

U.S. Pat. No. 6,061,129 by Ershov et al. teaches a grating spectrometer. A collimated beam is expanded with a (prism) beam expander before illuminating a reflecting grating and then contracted in a second pass through the beam expander before being directed onto a photodiode array. As such, this is also a double-pass apparatus. The placement of the beam expander before the reflecting grating introduces a number of problems. The reflecting grating must accept an expanded beam and thus must be physically larger, and accordingly more expensive. The alignment of the beam expander and the reflecting grating is also critical. Since the light beam must pass twice through the beam expander, any imperfections in and particularly any dust or film that may accumulate on the beam expander thus has two opportunities to effect measurement accuracy.

In sum, the state of the art systems are too complex. They are expensive, difficult to use and maintain, and not as accurate as desired. Accordingly, what is needed is an improved wavelength measurement system.

DISCLOSURE OF INVENTION

Accordingly, it is an object of the present invention to provide a simpler yet accurate wavelength meter.

Another object of the invention is to provide a wavelength meter which employs no moving components and, generally, fewer components overall.

And another object of the invention is to provide a wavelength meter which lends itself to use in more complex applications, such as concurrently metering multiple wavelengths or frequency locking in wavelength multiplexed systems.

Briefly, one preferred embodiment of the present invention is a system for measuring the wavelength of light present in a light beam. A light diverter is provided that is able to receive a first beam portion and provide from it a second beam portion having a transverse displacement characteristic. The light beam makes only a single-pass with respect to the light diverter. A light detection unit is further provided that is able to receive the second beam portion, detect the transverse displacement characteristic in it, and provide a raw signal based on this. The raw signal includes at least one intensity value based on the transverse displacement characteristic. A processor is also provided that is able to receive the raw signal and determine the wavelength of light present in the light beam from it.

An advantage of the present invention is that it is simpler and economical. Due to its use of fewer components in a single pass arrangement, the wavelength meter is easily set-up and maintained. Its use of fewer components, and particularly its ability to avoid the use of more complex components, such as curved gratings or complex, high-speed processors keeps the cost of the wavelength meter low.

Another advantage of the invention is that it may be implemented using either a transmissive or reflective light diverter, and a wide range of suitable light diverters may be chosen from to facilitate different goals. For example, transmissive or reflective diffraction gratings or multiple slit plates may be used. One diffraction grating can be used where it is desired to work with multiple channels concurrently. Or a multiple slit plate, optionally with simple a light diverger, can provide an economical arrangement.

Another advantage of the invention is that it may be implemented with a light diverger to enhance resolution, and the range of potential light divergers is broad and may therefore facilitate different goals. The light diverger may also be either transmissive or reflective, particularly facilitating constructing the wavelength meter in a variety of manners. In some embodiments overall compactness can be emphasized and in others susceptibility to undesirable influences can be minimized, like structural change due to temperature variation.

Another advantage of the invention is that it may be implemented with sophisticated signal processing techniques, such as phase sensitive detection, to further increase measurement accuracy and reliability.

And another advantage of the invention is that the problems it solves are pressing and there is a current need in at least one increasingly critical industry, telecommunications, for such a solution.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 1a–b are block diagrams presenting conceptual overviews of the inventive wavelength meter, wherein FIG. 1a depicts an embodiment using a light diverter and FIG. 1b depicts an embodiment using a light diverter and a light diverger;

FIG. 13a is a cross section view of a slit plate designed to produce data according to the graph in FIG. 12, and FIG. 13b is a formula that describes the relationships present in the slit plate of FIG. 13a;

FIGS. 14a–d are block diagrams depicting processing architectures which the invention may employ, wherein FIG. 14a depicts an analog embodiment, FIG. 14b depicts a digital embodiment, FIG. 14c depicts a single-ROM embodiment using table look-up supplemented processing, and FIG. 14d depicts a dual-ROM embodiment wherein a second memory stores wavelength values in an address space based on the first derivative of light intensity.

BEST MODE FOR CARRYING OUT THE INVENTION

Figure 1A:
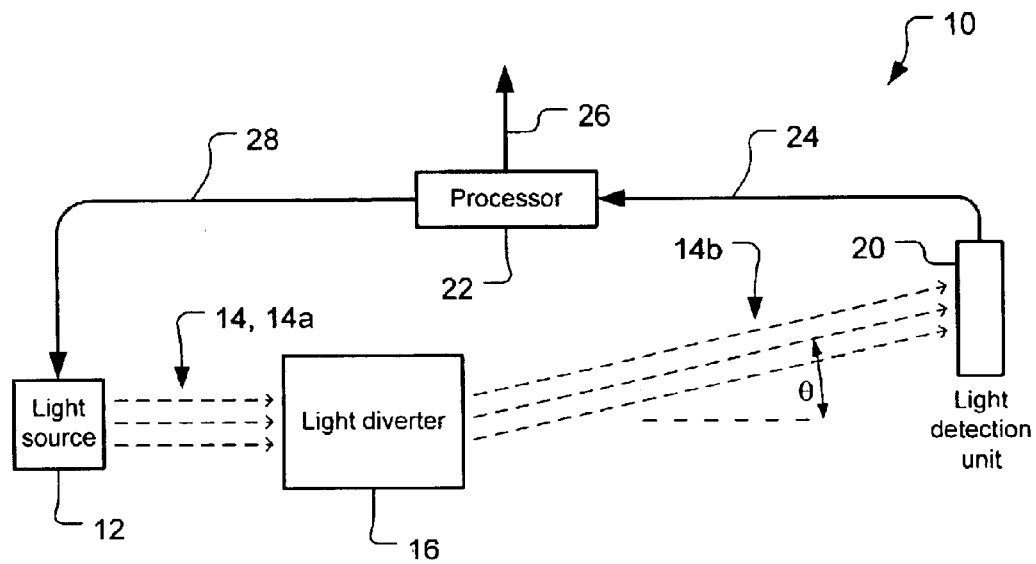

A preferred embodiment of the present invention is a light wavelength meter. As illustrated in the various drawings herein, and particularly in the views of FIG. 1a–b, forms of the preferred embodiments of the invention are depicted by the general reference character 10.

Figure 1B:
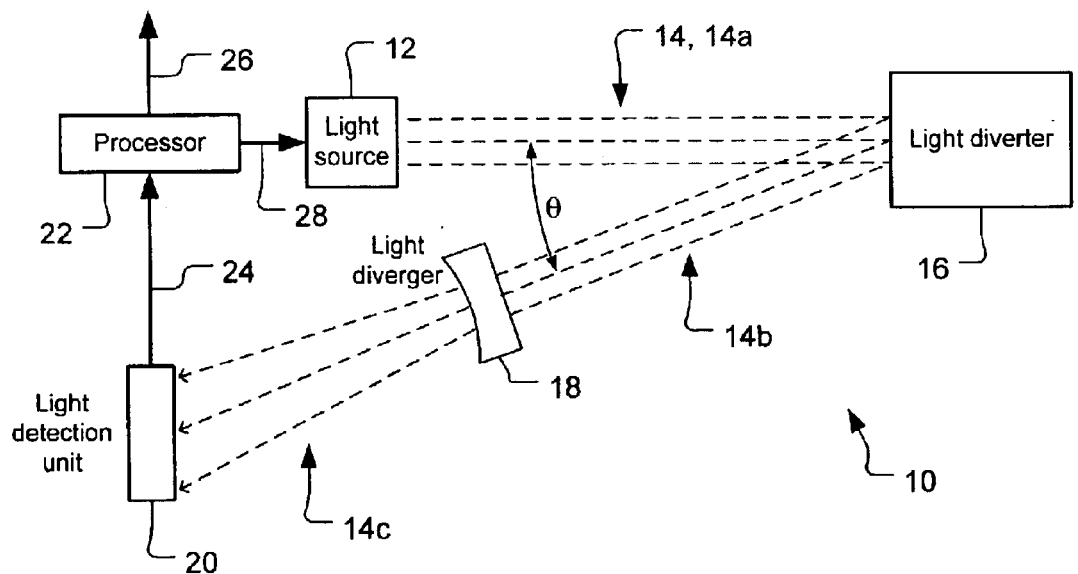

FIGS. 1a–b are block diagrams presenting simple conceptual overviews of the inventive wavelength meter 10. FIG. 1a depicts the invention particularly utilizing light transmission, and FIG. 1b depicts the invention particularly utilizing light reflection.

A light source 12 provides a light beam 14 which is generally collimated and coherent. The light source 12 may be controllable, and when the invention is used as a frequency locker setting the light beam 14 to or maintaining it at a specific frequency is the goal. It may be desired to set the light beam 14 to an absolute frequency, or to a frequency relative to some reference. The manner of controllably setting the frequency will usually be dictated by the light source 12, and can be accommodated by the wavelength meter 10. If the light source 12 can work with an absolute frequency, and has a pre-set desired frequency, the wavelength meter 10 can provide absolute frequency information and the light source 12 can self-adjust. Typically, however, the light source 12 will be used in a servo adjusting manner, wherein the wavelength meter 10 directs the magnitude, and optionally the direction, of frequency adjustment.

Frequency locking may be desired, for example, to use the light beam 14 itself as a reference, or to ensure that it does not interfere with systems employing light at another frequency. Once the light beam 14 is at a set frequency it will often also be desired to maintain it at that frequency. When the output light frequency of a system, such as the light source 12, changes unintentionally the result is called "drift." Drift may be caused by a number of reasons, such as temperature change or component aging, but its causes are not particularly important here. Rather, what is important here, is the ability to determine that it has occurred and to control the light source 12 to correct for it.

Continuing with FIG. 1a, a first beam portion 14a of the light beam 14 is received by a light diverter 16 which causes a second beam portion 14b to be diverted in a manner dependent particularly on the light wavelength. In FIG. 1a, the second beam portion 14b is directly received by a light detection unit 20.

FIG. 1b further depicts the invention including an optional light diverger 18, which receives the second beam portion 14b and causes a third beam portion 14c to be received by the light detection unit 20. As can be seen in FIGS. 1a–b, the invention employs a single-pass arrangement, directing the light beam 14 through or reflecting it off of the light diverter 16 only once. This is a key distinction over many of the known prior art systems.

A processor 22 is connected to the light detection unit 20 by a detector link 24. The processor 22 is also connected to an external system (optional and not shown here) by an external link 26. And the processor 22 is optionally connected to the light source 12 by a source link 28.

Many of the elements in FIGS. 1a–b may use the same components. For example, the light source 12, light diverger 18, light detection unit 20, processor 22, and the various links 24, 26, and 28 may be essentially the same for either light transmissive or light reflective variations of the wavelength meter 10. However, the light diverter 16 is necessarily different apparatus. Furthermore, as will become clear presently, in many cases the processor 22 and the various links 24, 26, and 28 which are actually present will differ based on whether the invention is being used for wavelength measurement or for frequency locking based on wavelength measurement.

Conceptually, the light source 12, and the light beam 14 which it produces, may be regarded as the "workpiece" upon which the invention proper operates. Accordingly, the light source 12 may be largely conventional and its nature is not particularly germane to the inventive aspects of the wavelength meter 10. Unlike the impression which may be created by drawing sheet limitations, the light source 12 may be quite removed from proximity with the wavelength meter 10. When this is the case, conventional optical components, e.g., lenses, mirrors, prisms, optical fibers, etc., may be employed in the light source 12 to convey the light beam 14 as needed for presentation to the light diverter 16 (particularly with regard to collimating the light beam 14). Conventional optical components may also be provided and used for concurrently tailoring the light beam 14 as may be particularly desired, e.g., filtering or polarizing it. Some example reasons and benefits for this are described presently. In many embodiments it is anticipated that the light source 12 will include a laser, but this is not a requirement and the invention may be beneficially used with other types of light sources as well.

The light diverter 16 is a key element of the invention. Simplistically stated, the operational concept of the light diverter 16 is that it diverts the second beam portion 14b from the direction of the first beam portion 14a in some manner, and the amount of angular diversion (θ in FIGS. 1a–b) is based on the light wavelength. The light detection unit 20 is then able to detect this angular diversion.

The optional light diverger 18 may be used to extend the resolution capability of the light detection unit 20. This may simply be desirable or it may be motivated by limits imposed by the nature of the light diverter 16 or the dimensions in the wavelength meter 10. As will become clear below, the light characteristics which need to be resolved in the second beam portion 14b may be quite close together and need to be further separated.

The light diverter 16 and the light diverger 18 are illustrated by examples of a number of variations, discussed presently. The more conventional and conventionally used elements of the inventive light wavelength meter 10 are discussed first.

The light detection unit 20 may include a wide variety of conventional sensor types, including photodiodes, photodiode arrays, bi-cells, and particularly quad-photocells. Based on either the presence or the absence of light and its intensity, the light detection unit 20 creates a signal in which the current or voltage varies. This signal is then communicated to the processor 22 via the detector link 24.

If the wavelength meter 10 is used just for determining light wavelength or frequency, the processor 22 may be the ultimate reporting system or it may include a system which tailors or converts the signal it receives over the detector link 24, before communicating with an ultimate system via the external link 26. For example, it may be desirable to tailor the signal by amplifying or filtering it, or to convert it into a digital signal. These are commonly used to minimize interference and insure measurement reliability, as well as to match with a protocol of a receiving system.

If the wavelength meter 10 is used to lock the frequency of the light source 12, it again may also tailor or convert the signal it receives over the detector link 24. But here a key purpose is to minimize interference and insure frequency locking reliability, before communicating with the light source 12. It may also need to match its communications via the source link 28 with a protocol of the light source 12.

Those skilled in the art will appreciate that the invention may be concurrently used as both a wavelength meter and a frequency locker. In this respect the invention may serve in a feedback role to control the light source 12, yet also serve in a monitoring role to report wavelength information to an external system, either for its direct empirical value or for evaluation with respect to time to determine system stability or feedback effectiveness. Providing this capability requires only a slight increase in the sophistication of the processor 22.

The processor 22 can be constructed from a wide range of existing electronic components, with suitable new ones entering the marketplace on almost a daily basis. For instance, many common microprocessor or "circuit on a chip" systems can be used in at least simpler embodiments of the invention. One key selection factor often will be signal processing capability, typically to perform analog to digital (A/D) signal conversion. Another factor often will be processing speed, to timely handle receiving, processing, and outputting signals as required on the various links 24, 26, and 28.

Figure 2:
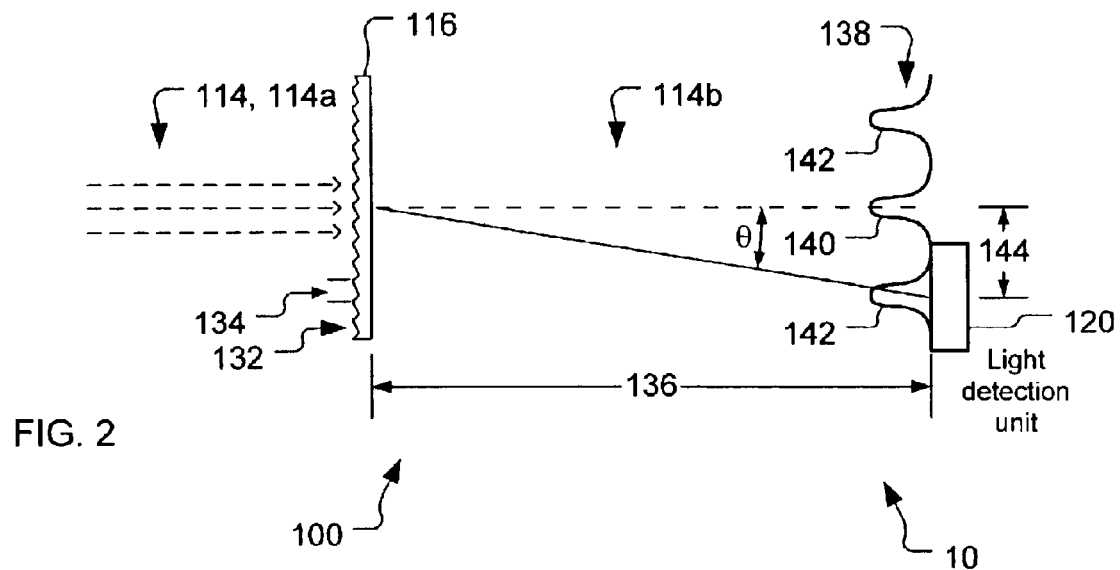
FIG. 2 is a block diagram presenting an embodiment of the invention based on a transmissive diffraction grating type light diverter.

FIG. 2 is a block diagram presenting the key distinguishing features of a transmissive diffraction grating embodiment 100 of the inventive wavelength meter 10. A light source (not shown here but equivalent to the light source 12 in FIGS. 1a–b) provides a light beam 114 having a first beam portion 114a. A diffraction grating 116 is placed in the path of the light beam 114 such that it receives the first beam portion 114a and projects a second beam portion 14b onto a position sensitive detector (PSD 120), used here as the equivalent of the light detection unit 20 in FIGS. 1a–b.

FIG. 2 depicts a transmissive type of diffraction grating 116, but reflective types may also be used, and an example is discussed presently. The diffraction grating 116 may be conventional or otherwise, but characteristically has a plurality of parallel grooves 132 having a consistent groove spacing 134 ("d" in the equations). When using a transmissive type diffraction grating 116, the light beam 114 is preferably, but not necessarily, directed normal to the diffraction grating 116. The diffraction grating 116 is also placed at a set separation distance 136 ("X" in the equations) from the PSD 120. Making these factors constant and known eliminates additional apparatus to measure them and simplifies calculations.

The PSD 120 may include a wide variety of sensor types, suitable for working with a processing system (like the processor 22 of FIGS. 1 a–b). For use with 600 nanometer (nm) lasers in the light source, the inventor currently uses a part number 1521A laser senor as the PSD 120 and a part number 1522A signal processor in the processor, both manufactured by Excel Precision Corporation of Santa Clara, Calif. The 1521A is a quad-photocell unit capable of 0.1 micron resolution when used with the 1522A signal processor.

As can be seen in FIG. 2, the grooves 132 of the diffraction grating 116 scatter the second beam portion 114b of the light beam 114 such that an intensity profile 138 is produced (stylistically depicted in the figures), due to constructive and destructive (interference) effects. This intensity profile 138 exhibits a central maximum 140 as well as first principal maximums 142. The first principal maximums 142 are of present interest, since they are displaced from the central maximum 140 at an offset distance 144 which can be measured with the PSD 120.

Turning away somewhat from FIG. 2 now to a discussion of some underlying principles, a diffraction grating scatters light as described by the equation:

$$d(\sin i + \sin \theta) = m\lambda \qquad \text{Eq. 1:}$$

where d is the groove spacing, i is the angle of incidence of the light beam on the grating (measured from normal), m is an integer indicating the order of the spectrum produced, $\theta$ is the angle of the scattered light with respect to the normal, and $\lambda$ is the light wavelength.

The factor m is present because the grating produces more than one spectrum. For m=0, undiffracted light is transmitted directly through the grating without any dispersion (this produces the central maximum 140). For m=1, the first-order or strongest spectrum is produced. For m=2, 3, etc., still higher-order spectra are produced (not shown in FIG. 2 but potentially present off the ends of the intensity profile 138 which is shown there, since the higher-order spectra are spread over larger angles ($\theta$) because the wavelength ($\lambda$) is multiplied by m). Because the intensity decreases as the value of m increases, a first-order spectrum is best for most practical purposes (i.e., the principal maximums 142). There are techniques known in the art to reduce the higher-order spectra, and the use of such may also be desirable to reduce the possibility of spurious reflections reaching a sensor.

When a light beam is normal to a grating, as was intentionally made the case in FIG. 2, and when only a first-order spectrum is of concern (m=1) (i.e., the first principal maximum 142), Eq. 1 reduces to:

$$d(\sin \theta) = \lambda \text{ or } \sin \theta = \lambda/d \qquad \text{Eq. 1:}$$

Thus, for FIG. 2 with light having a wavelength of 600 nm, a diffraction grating having 20,000 grooves per inch (also commonly referred to as "lines per inch"), and using the first principal maximum, Eq. 2 tells us that sin $\theta$=(600 nm)/(25.4 mm/20,000)≅0.47, or $\theta$≅28 degrees.

However, from FIG. 2 it can also be appreciated that:

$$\sin \theta = Y/\sqrt{(Y^2 + X^2)} \qquad \text{Eq. 3:}$$

and it follows that:

$$\lambda/d = Y/\sqrt{(Y^2 + X^2)}, \text{ and thus}$$

$$Y = \sqrt{((\lambda/d)^2 * X^2)/(1-(\lambda/d)^2)} \qquad \text{Eq. 4:}$$

Continuing with the example, using 100 mm as the set separation distance 136 (X) permits calculation of the offset distance 144 (Y). Here Y≅53.6 mm when the light wavelength is 600 nm. Conversely, when the wavelength of a light beam is not known, or not known with precision, the wavelength meter 10 can be used to measure the offset distance 144, using the PSD 120 and the processor, and when Y=53.6 mm it is known that the light wavelength is 600 nm.

The preceding summarizes some key underlying principles but may not immediately impress upon the reader just how powerful the invention is. For emphasizing that, the example in FIG. 2 can be taken yet further to show how a small change in the wavelength of the light beam 114 causes a measurable change in the offset distance 144 (Y). And again conversely, how a measured change in Y permits one to know the change in the wavelength and thus the frequency of the light beam 114.

From Eq. 4 it follows that:

$$\Delta\lambda = \lambda' - \lambda$$

$$\Delta\lambda = d*(Y'/\sqrt{(Y'^2+X^2)} - Y/\sqrt{(Y^2+X^2)})$$

$$\Delta\lambda \approx d*(Y'-Y)/\sqrt{(Y^2+X^2)}$$

$$\Delta\lambda \approx d*(\Delta Y)/\sqrt{(Y^2+X^2)}$$

and:

$$\Delta Y = Y' - Y, \text{ so}$$

$$\Delta Y = \Delta\lambda * \sqrt{(Y^2+X^2)}/d \qquad \text{Eq. 5:}$$

However, as is well known, $f = c/\lambda$ where f is the light frequency and c is the constant $3*10^8$ m/sec. And it is readily apparent that:

$$\Delta f/f = -\Delta\lambda/\lambda.$$

Thus, in our ongoing example here, $f=(3*10^8$ m/sec$)/600$ nm$=5*10^{14}$ Hz and a change of 1 GHz produces a change in wavelength ($\Delta\lambda$) by an amount of $2*10^{-6}$. Substitution using Eq. 5 provides that:

$$\Delta Y = 2*10^{-6}*600 \text{ nm}*\sqrt{((53.6 \text{ mm})^2+(100 \text{ mm})^2)}/(25.4 \text{ mm}/20,000)$$

$$\Delta Y = 0.18*600 \text{ nm}$$

$$\Delta Y = 0.1 \text{ }\mu\text{m}$$

A change of 0.1 micron is a detectable quantity for modem position sensitive detection systems, such as the 1521A and 1522A noted above. Thus, again conversely and with all else remaining constant, the fact that a 1 GHz frequency change produces such a measurable change in the offset distance 144 means that when such a change does occur, a 1 GHz frequency change must have produced it. Accordingly, the wavelength meter 10 is capable of measuring light frequency with at least a 1 GHz resolution.

Figure 3:
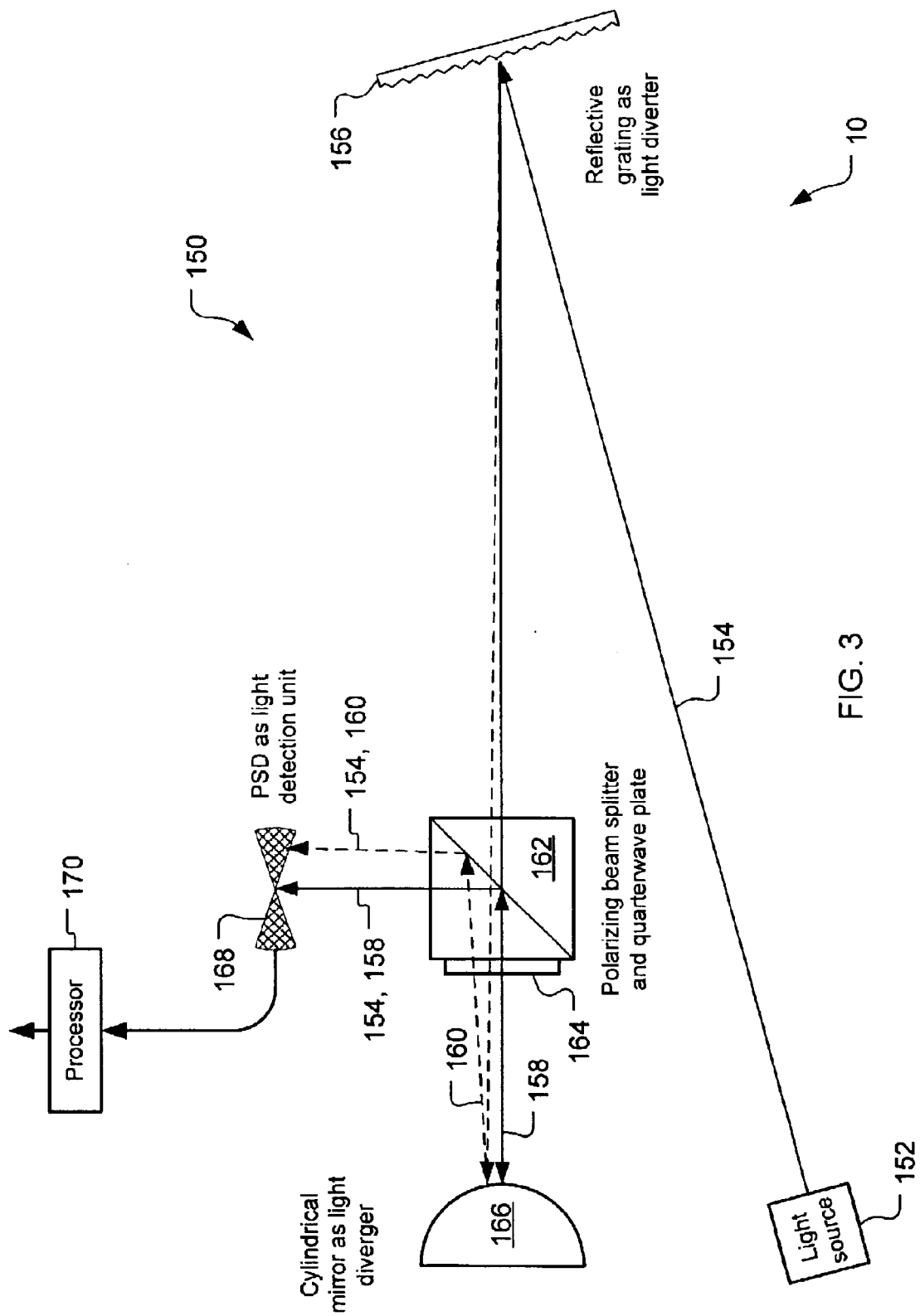
FIG. 3 is a block diagram presenting an embodiment of the invention based on a reflective diffraction grating type light diverter.

FIG. 3 is a block diagram presenting a reflective diffraction grating embodiment 150 of the inventive wavelength meter 10. A light source 152 provides a coherent light beam 154, of which it is desired to know the light frequency or wavelength. A diffraction grating 156 is placed in the path of the light beam 154 such that the principal maximum of the light beam 154 proceeds along a normal path 158 (defined presently) when the light beam is of one particular wavelength, and the principal maximum instead proceeds along a non-normal path otherwise. One such non-normal path 160 is shown in FIG. 3 for exemplary purposes. Those skilled in the art will recognize, however, that an infinite number of non-normal paths are possible, depending on the principal maximum of the light beam 154 after it passes the diffraction grating 156. The diffraction grating 156 is therefore suitably positioned such that the light beam 154 is projected into a polarized beamsplitter 162, which it passes through and into, and then also through a quarterwave plate 164.

The light beam 154 then travels onward to a cylindrical mirror 166, where it is reflected back into and through the quarterwave plate 164 and again into the polarized beamsplitter 162. However, due to passage twice through the quarterwave plate 164, the polarization of the light beam 154 is now changed such that the polarized beamsplitter 162 redirects it rather than passing it directly through as before. The light beam 154 is thus directed into a position sensitive detector (PSD 168) which is connected to an appropriate processor 170.

It should be noted that the initial polarization relationship between the light beam 154 and the wavelength meter 10 is suitably arranged such that the light beam 154 first passes through the polarized beamsplitter 162 and is later redirected by it. This is, however, usually just a simple matter of correct equipment set-up. [Of course, an alternate component arrangement could also be made wherein a beam is first redirected and later passed directly.]

As can be appreciated, the embodiment depicted in FIG. 3 employs many of the principles depicted in FIG. 2. The light source 152 may be conventional or otherwise, and often will include a laser and beam conveying elements. If desired, the light source 152 may also include polarization setting elements, to assure that the initial polarization relationship is suitable.

Unlike the case in FIG. 2, the diffraction grating 156 in FIG. 3 is a reflective type but, again, suitably directing the light beam 154 simplifies calculation in the processor 170 or an external system. The PSD 168 used here may also include a wide variety of sensor types, including the quad-photocell Excel Precision 1521A laser senor.

The representation of the wavelength meter 10 in FIG. 2 does not include any components equivalent to the polarized beamsplitter 162 and the quarterwave plate 164. The use of these in the embodiment of FIG. 3 beneficially allows the reflected light beam 154 to be observed at a transverse direction. As depicted, the PSD 168 can thus be placed away from all but the final path of the light beam 154.

The representation of the wavelength meter 10 in FIG. 2 also does not include any component equivalent to the cylindrical mirror 166, since the transmissive type of diffraction grating 116 used there permits direct projection of the light beam 114 onto the PSD 120. The use of a cylindrical mirror, or equivalents, provides a considerable benefit, however. Firstly, the use of any type of mirror permits the optical separation distance between the diffraction grating and the PSD to be increased, while also keeping the overall size of the wavelength meter 10 usefully small. Doing this also increases the offset distance (the distance between the central maximum and the first principal maximum) to permit higher resolution measurement. Secondly, however, the curve of a cylindrical type mirror has an amplifying effect on the angle of reflection when the light beam 154 follows any of the non-normal paths 160. This deviation angle typically is very small, making it difficult to separate the incident and the reflected portions of the light beam 154. Such an amplifying effect therefore increases the angle of reflection of the light beam 154 as it deviates from the normal path 158, and enhances the angular resolution of the wavelength meter 10.

While the inventor prefers to use a cylindrical mirror, equivalents may also be used in some alternate embodiments. For example, without limitation, a differently shaped mirror might be used, say, a hemi-spherical one. Or multiple angle multiplying elements may be used, for instance, two or even more curved mirrored surfaces. Alternately, there are examples in the art of curved reflective type diffraction gratings, and these are theoretically usable as angular resolution amplifiers. However, the use of such shaped gratings is generally undesirable because they add distortion, and that is further exacerbated in a manner difficult to correct for if temperature fluxuation is permitted to change the grating dimensions. In sum, gratings are precision elements in which groove spacing and surface finish are critical, making even simpler, flat gratings difficult to manufacture and expensive.

In this embodiment, a quad-photocell type PSD 168 and a suitably mated processor 170 are used, but equivalents may also be suitable here. In FIG. 3 the grooves in the diffraction grating 156 and the central axis of the cylindrical mirror 166 are depicted as being essentially perpendicular to the page. This facilitates appreciation that a suitably aligned bi-cell or other single axis type PSD may be used, since where the light beam 154 falls on the PSD 168 will generally occur along a straight line. As a practical matter, however, obtaining and maintaining such alignments, and particularly trusting in such being the case, is difficult and will not justify the effort.

The embodiment of the wavelength meter 10 shown in FIG. 3 operates as follows. The components are positioned in the manner shown and particularly aligned such that when the light beam 154 has a desired wavelength it is directed onto the reflective diffraction grating 156 at an angle such that a first principal maximum reaches the center of the cylindrical mirror 166, i.e., it follows the normal path 158. This in turn causes the light beam 154 to reach the PSD 168 such that it shines equally on all of the detectors in the PSD 168 (e.g., all four detectors if a quad cell type is employed). Conversely, if the light beam 154 is not of the desired wavelength, a non-normal path 160 will be followed and the first principal maximum used will be reflected off of the cylindrical mirror 166 elsewhere then at its center. The light beam 154 will then not shine equally onto all of the detectors and the PSD 168 will produce an error signal which is directly representational of this deviation. The processor 170 can then use this error signal to determine what the difference in the wavelength is and by implication, since the desired wavelength is known, what the actual wavelength or frequency is of the light beam 154.

Alternately, the wavelength meter 10 may be used as part of a larger system which employs either actual or relative measurements made with it. For example, the error signal from the PSD 168, in most cases suitably tailored by the processor 170, can be used to control the device producing the light beam 154 to change the wavelength to one that is desired, and to then minimize drift from that wavelength. This permits particularly important applications of the wavelength meter 10 which are discussed in more detail below.

Figure 4:
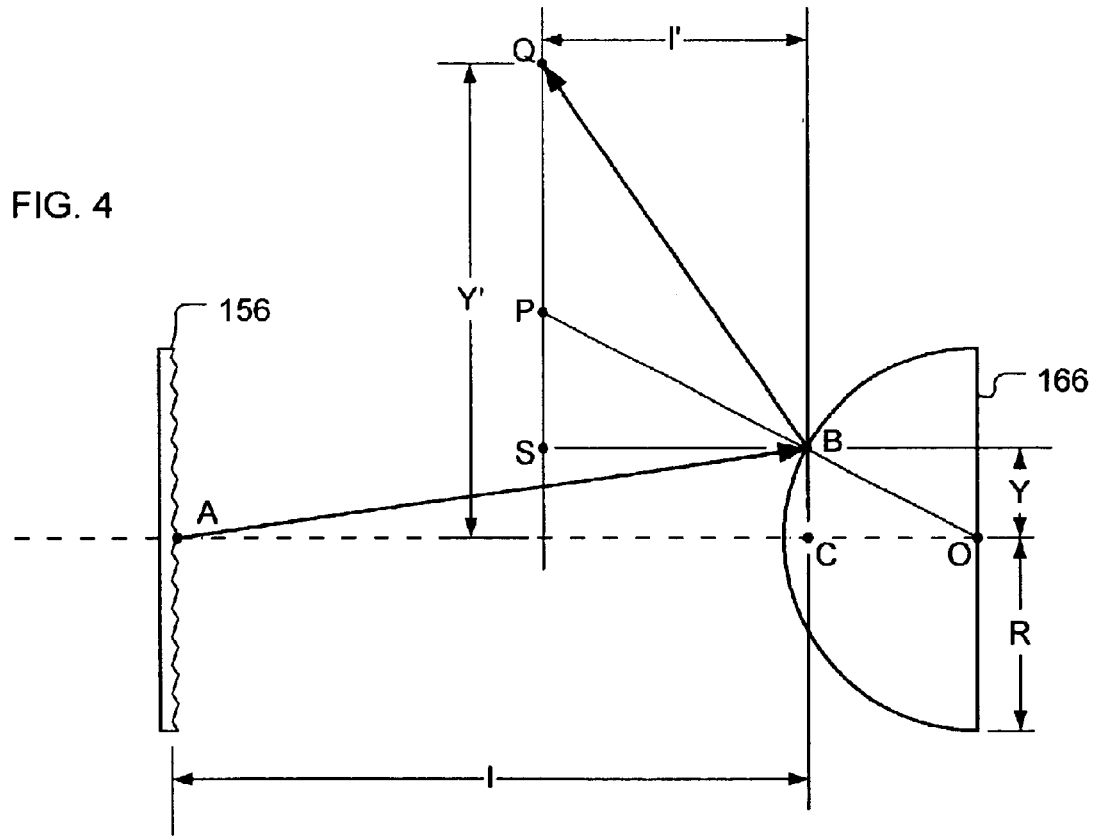
FIG. 4 is a block diagram illustrating details of the principle of angular resolution extension employed in some the embodiments of the invention.

FIG. 4 is a block diagram illustrating details of the principle of angular resolution extension introduced in the embodiment of the wavelength meter 10 depicted in FIG. 3. The separation distance between the grating and the mirror is 1 and the radius of the cylindrical mirror is R.

Assuming that BAC and BOC are very small:

$$BC=1*(BAC)=R*\sin(BOC) \approx R*(BOC)$$

and it follows that:

$$(BOC)=1/R*(BAC).\qquad\text{Eq. 6:}$$

The reflected angle from the mirror surface then is:

$$(QBA)=(QBP)+(PBA).$$

But since $(PBA)=(BAC)+(BOC)=(1+1/R)*(BAC)$ and $(QBP)=(PBA)$, it follows that:

$$(QBA)=2*(1+1/R)*(BAC).\qquad\text{Eq. 7:}$$

Assuming that all angles are small, the displacement from the axis AO is:

$$Y'=BC+1'*\tan(QBS)$$

$$Y' \approx BC+1'*(QBS)=BC+1'*(QBA-BAC).$$

So:

$$(QBS)=(1+2*1/R)*(BAC).$$

This becomes:

$$Y'=BC+1'*(1+2*1/R)*(BAC).$$

Turning to an example, if 1=1'=100 mm, R=5 mm, and BC/AC=(BAC)=10$^{-6}$ radians:

$$Y'=100\text{ mm}*10^{-6}+100\text{ mm}*(1+2*100\text{ mm}/5\text{ mm})*10^{-6}$$

$$Y'=1\times10^{-4}\text{ mm}+41\times10^{-4}\text{ mm}$$

$$Y'=4.2\times10^{-3}\text{ mm}.$$

And it can be seen that the angular resolution is increased some 40 times. Thus, the cylindrical mirror increases the angular resolution by 1/R times.

Figure 5:
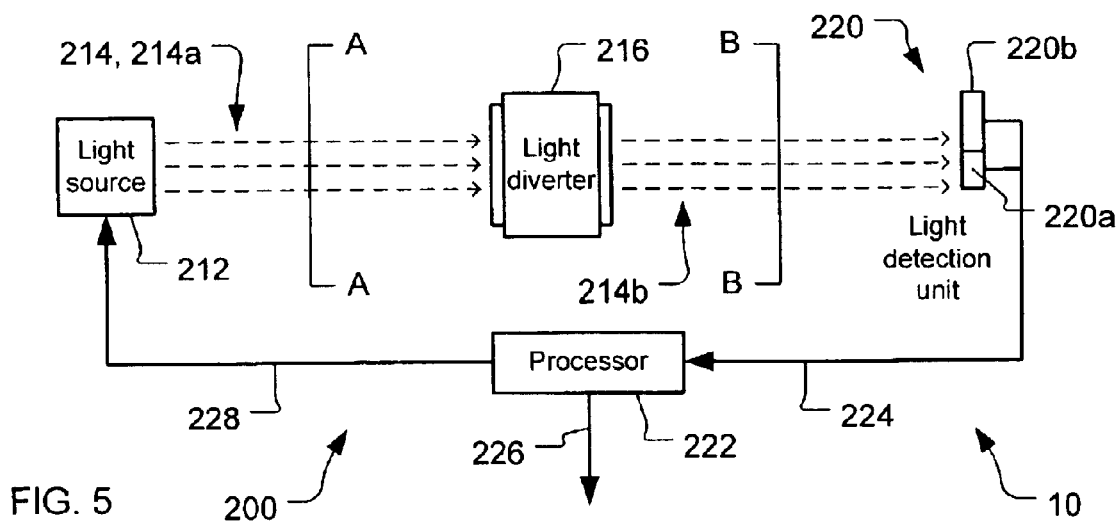
FIG. 5 is a block diagram presenting an embodiment of the invention based on a Fabry-Perot interferometer type light diverter.

FIG. 5 is a block diagram presenting a Fabry-Perot interferometer embodiment 200 of the inventive wavelength meter 10. A light source 212 produces a light beam 214, having a first beam portion 214a and a second beam portion 214b. The first beam portion 214a is received by a Fabry-Perot interferometer (F-P interferometer 216, serving here as a transmissive light diverter) which imparts to the second beam portion 214b a transverse displacement characteristic. The second beam portion 214b is, in turn, received by a light detection unit 220 which detects aspects in the second beam portion 214b and produces a raw signal which is representative thereof. A processor 222 receives this raw signal via a detector link 224 and, based there on, produces one or more processed signals. One processed signal is then communicated via an external link 226 to an external system (not shown) or via a source link 228 to the light source 212. Or the same or different processed signal may be communicated via both the external link 226 and the source link 228 concurrently.

Figure 6A:
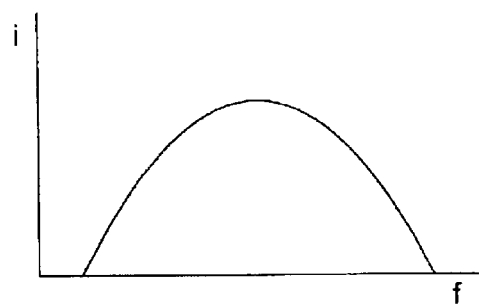
FIG. 6a is a graph depicting light frequency verses intensity at a point where a first beam portion is crossed by reference A—A in FIG. 5.
Figure 6B:
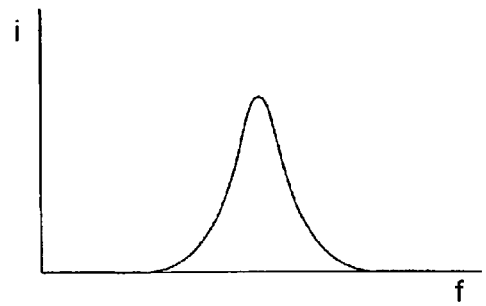
FIG. 6b is a graph depicting light frequency verses intensity at a point where a second beam portion is crossed by reference B—B in FIG. 5.

FIG. 6a is a graph depicting light frequency verses intensity at a point on the first beam portion 214a crossed by reference A—A in FIG. 5, and FIG. 6b is a graph depicting light frequency verses intensity at a point on the second beam portion 214b crossed by reference B—B in FIG. 5. As such, FIG. 6a–b represent before and after depictions of one characteristic effect of the F-P interferometer 216.

Figure 6C:
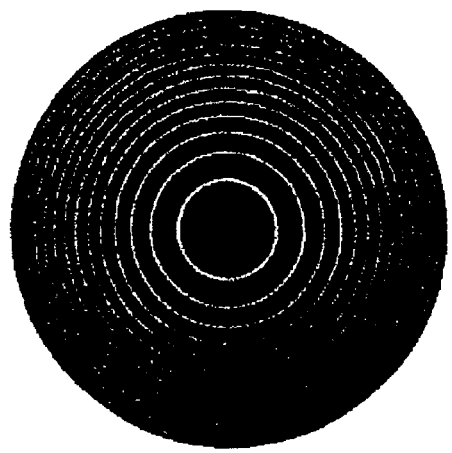
FIG. 6c is a diagram depicting light intensity across a plain section through reference B—B in FIG. 5.

FIG. 6c is a diagram depicting light intensity across a plain section through reference B—B in FIG. 5. As such, FIG. 6c represents another characteristic effect of the F-P interferometer 216, a regular pattern of alternating bright and dark interference fringes in which the centermost region may be either light or dark.

Fabry-Perot interferometers are well known in the art, being basically a two (parallel) mirrored cavity with no optical components between the mirrors. The reflecting surfaces of the mirrors are partially reflective and arranged in parallel separated by a distance (when firmly fixed the device is an etalon, and the Fabry-Perot interferometer is hence sometimes called a Fabry-Perot etalon). When light of a particular frequency bandwidth enters the Fabry-Perot interferometer only light of a narrower frequency bandwidth will exit (as FIGS. 6a–b depict). This is termed the "finesse" or F, and $F=(\pi\sqrt{R})/(1-R)$ where the mirrors have the same reflectivities R. With a finesse of 100, only 1% of the incoming bandwidth is transmitted.

In simple cases, where the first beam portion 214a enters the F-P interferometer 216 at a normal angle and there is no appreciable reflective phase change, maxima (or "enhancements") occur where $\lambda_n=2d/n$. Or in terms of the frequencies, $f_n=nc/2d$ (simplifying with the refractive index=1). Then $\Delta v=c/2d$ and the maxima occur at equal frequency spacings that are independent of the specific value of frequency or wavelength.

The above discussion is not intended to be a rigorous one of the principles of the Fabry-Perot interferometer. For that we commend interested readers to any of the numerous excellent texts on the optical arts. Rather, the above discussion is intended to act as a refresher and to introduce terminology used below.

Returning now to FIG. 5, the light detection unit 220 is preferably a combination of an intensity sensitive detector 220a and a position sensitive detector 220b. The intensity sensitive detector 220a is placed to receive and detect the light intensity at a point in the second beam portion 214b. The center of the pattern depicted in FIG. 6c is one suitable place, but this is not a requirement. The position sensitive detector 220b is placed at another point in the second beam portion 214b, one where it detects change in the position of a maxima (or a minima) in the pattern.

Figure 6D:
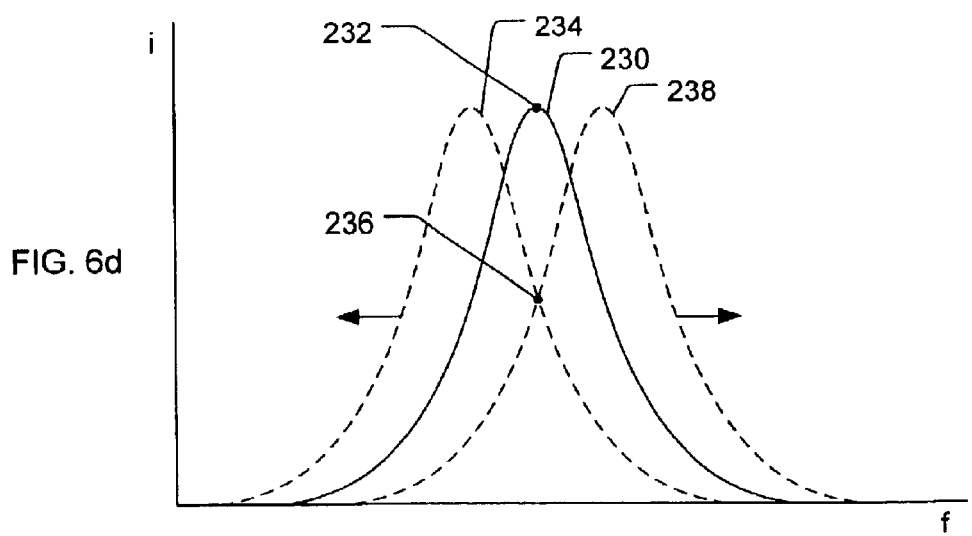
FIG. 6d is a graph depicting why detecting intensity and position is preferable.

FIG. 6d is a graph depicting why this arrangement is preferable. A central intensity plot 230 conceptually represents a potentially optimal situation at the intensity sensitive detector 220a, where a peak point 232 represents the intensity the intensity sensitive detector 220a will detect. However, if the frequency drifts lower, as depicted by a lower intensity plot 234 (shown dashed) a non-peak point 236 now represents the intensity which the intensity sensitive detector 220a will detect; and if the frequency drifts higher, as depicted by a higher intensity plot 238 (also dashed) the same non-peak point 236 (here) again represents the intensity which the intensity sensitive detector 220a will detect. Thus, the problem is that the intensity sensitive detector 220a cannot be used by itself to determine the nature of a frequency change.

The inventor's preferred solution to this problem is to use the intensity sensitive detector 220a to accurately determine intensity and to also use the position sensitive detector 220b to determine movement of a maxima toward or away from the center of the pattern in FIG. 6c. In very simple embodiments, simple in apparatus but not in the set-up effort need to make them work, the intensity sensitive detector 220a and the position sensitive detector 220b can both be just photodiodes. An improvement on this, however, is to use a bi-cell or photodiode array as the position sensitive detector 220b. And a still further improvement is to use a quad-photocell unit as the position sensitive detector 220b. With a quad-cell the wavelength meter 10 can accurately determine the start, nature, and rate of frequency drift, and can additionally be used to provide feedback to obtain very precise frequency locking.

Figure 7:
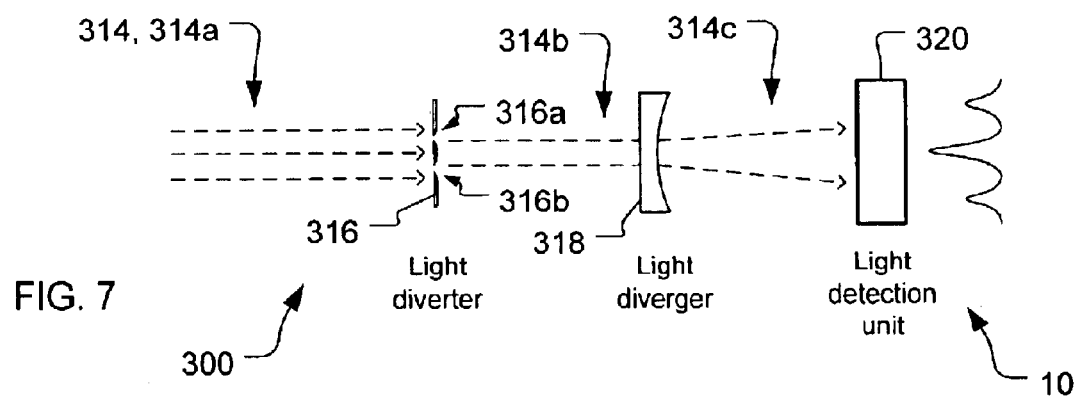
FIG. 7 is a block diagram presenting an embodiment of the invention based on a multiple slit type light diverter.

FIG. 7 is a block diagram presenting a multiple slit embodiment 300 of the inventive wavelength meter 10. A light source (not shown) produces a light beam 314, having a first beam portion 314a and a second beam portion 314b. The first beam portion 314a is received at a slit plate 316 (serving here as a transmissive light diverter) which imparts to the second beam portion 314b a transverse displacement characteristic. The second beam portion 314b is, in turn, received by a diverging lens 318 (used as a light diverger for angular resolution extension here) and produces a third beam portion 314c. A light detection unit 320 then detects aspects of the transverse displacement in the third beam portion 314c and produces a raw signal which is representative thereof. With techniques and components described elsewhere herein, this raw signal can then be appropriately processed to meter the wavelength or lock the frequency in the light beam 314.

Aside from the alternate type of light diverter and the addition of a light diverger here, this embodiment may be substantially the same as the one depicted in FIG. 5. Alternately, in this embodiment a reflective type of slit plate 316 may also be employed, making a variation on this embodiment having a component layout geometry resembling that of the embodiment in FIG. 1b.

The slit plate 316 is representationally depicted in an exaggerated manner in FIG. 7. In actual practice the slits 316a, 316b, and particularly their separation, would not generally be detectable by the human eye. Although slit plates are widely used today which do have two or more slits separated by appreciable distance, the slit plate 316 of the inventive light wavelength meter 10 is not of this type. Rather, while it similarly has two or more parallel slits, these are separated by a distance on the order of merely a few wavelengths of the light in the light beam 314. It is this which causes the light of the second beam portion 314b to exhibit an interference pattern. In this regard, and others, this embodiment works much as those already described which use diffraction gratings. A first darkness appears at an angle from normal dictated by the wavelength of the light in the light beam 314. The light detection unit 320 is placed to determine what the angle actually is, and thus permits calculation of what the wavelength is. Or the light detection unit 320 can be used to assist in tuning to obtain a specific angle and thereby to control the frequency of the light in the light beam, monitoring for and correcting for any frequency drift as needed.

One advantage of using a slit plate 316 as a light diverter is economy. Slit plates may be made using widely available, well known, and inexpensive materials and processes. Furthermore, they can be made having very precise dimensions at relatively little extra cost. Semiconductor production type processes, such as optical lithography, can be used to place regions defining micro lines which are etched to be transparent, covered to become opaque, or coated with substances like aluminum to become reflective. Or electron beams can be used to make material in plate regions opaque or bright (reflective). Placing lines on plates with widths and separations of 0.15 microns is achievable with conventional technology today.

Various suitable components to serve as the diverging lens 318 are also well known, and the stylized depiction of it as a simple concave lens in FIG. 7 should not be interpreted as a requirement. For instance convex mirrored surfaces have been discussed elsewhere herein and even an assembly of two basic triangular prisms can expand a light beam along one axis.

Figure 8:
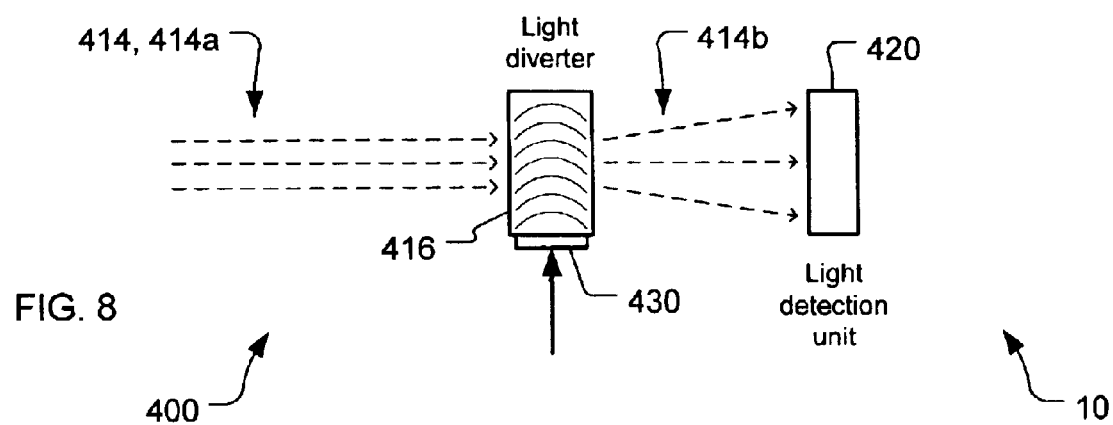
FIG. 8 is a block diagram presenting an embodiment of the invention based on an acousto-optical based type light diverter.

FIG. 8 is a block diagram presenting an acousto-optical embodiment 400 of the inventive wavelength meter 10. A light source (not shown) produces a light beam 414, having a first beam portion 414a and a second beam portion 414b. The first beam portion 414a is received at an acousto-optical unit 416 (serving here as a transmissive light diverter) which imparts to the second beam portion 414b a transverse displacement characteristic. A light detection unit 420 then detects aspects of that displacement characteristic in the second beam portion 414b and produces a raw signal which is representative thereof. With techniques and components described elsewhere herein, this raw signal can then be appropriately processed to meter the wavelength or lock the frequency in the light beam 414.

The acousto-optical unit 416 includes an acousto-optic crystal, such as $LiNbO_3$, ADP, KDP, etc. In the acousto-optic crystal the light beam 414 is modulated by interaction with sound waves, typically created by a piezo-electric device 430. As an acoustic wave passes, it raises and lowers pressure in the crystalline structure and thus changes the refractive index. Effectively, these refractive index variations can be seen as lines in a diffraction grating, i.e., as an "acoustic grating." The basic operational principle here is: light is diverted at an angle depending on the ratio of the wavelengths of the light and the sound in the acousto-optic crystal medium.

The fact that the acoustic wave can be changed provides the acousto-optical unit 416 with a capability which many other light diverters lack, including those described elsewhere herein. By controlling the wavelength of the sound, the angle of the light beam 414 can be adjusted or "tuned" as desired to control where it falls on the light detection unit 420.

Figure 9:
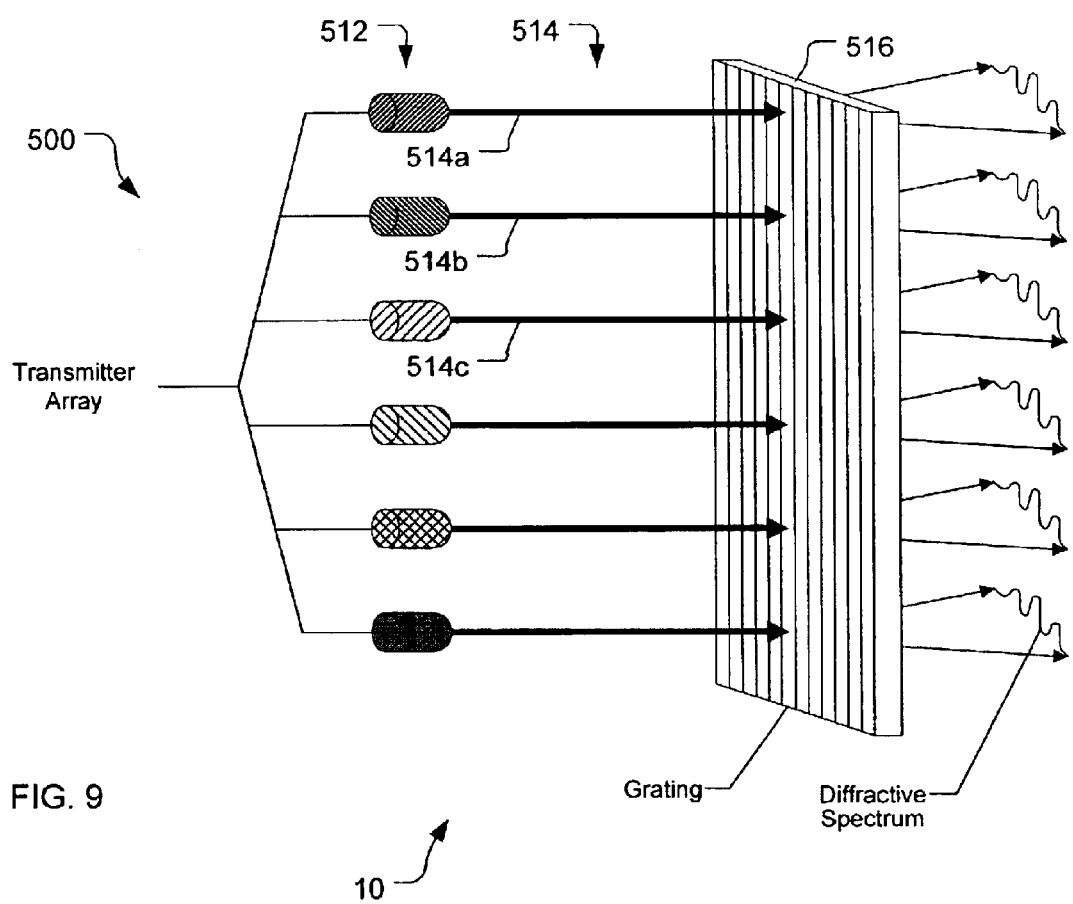
FIG. 9 is a block diagram presenting a multiple channel frequency locker based on the present invention.

The wavelength meter 10 has been described up to here, generally, with embodiments that avoid detail not particularly germane to the invention. However, those skilled in the art will readily recognize that the wavelength meter 10 may be used in more complex arrangements. FIG. 9 is a block diagram presenting one such arrangement utilizing the wavelength meter 10 to form a multiple channel frequency locker 500. A transmitter array 512 provides a number of light beam channels 514 to a light diverter 516. The light beam channels 514 each have a similar transverse displacement characteristic (a diffractive spectrum) imparted to them by the light diverter 516. The use of one common light diverter 516, such as a diffraction grating, and suitable arrangement of the light beam channels 514 with it, achieves better accuracy and is economical, but is not an absolute requirement.

Light detection units linked to one or more processors (not shown) permit determining the light wavelength of any or all of the individual light beam channels 514. Alternately, or concurrently, this also permits locking the light beam channels 514 into fixed light frequency relationships. For instance, each light beam channel 514 can be locked to a frequency 5 GHz away from the nearest others. Of course, a light diverger could also be employed to facilitate obtaining higher resolution.

As just one practical example, frequency locking is highly desirable in telecommunications. In practice, the transmitter array 512 will typically provide a sample, say, off of an optical fiber in a larger communications system. Each light beam channel 514 present may be modulated with data and needs to be locked within a bandwidth such that it does not interfere with and can be detected separate from the other light beam channels 514. Obviously, if channel 514a drifts lower in frequency and channel 514c drifts higher, all of channels 514a, 514b, and 514c might interfere. A usable alternative is that all of the light beam channels 514 be locked into a relationship with one channel, say, channel 514a, and that any frequency drift at least be forced to be the same. Better still, however, is to pick one channel, say, channel 514a again, and to lock it to a desired frequency and then further lock all of the other channels in relation to channel 514a. In this manner, interference between channels is avoided and detection and demodulation of the data in the respective channels is facilitated.

The present invention also lends itself to embodiment with sophisticated signal processing techniques, with which even more accurate and reliable measurements can be made. For example, U.S. Pat No. 5,991,112 by Tsai et al., incorporated herewith by reference, teaches the use of phase sensitive detection in laser interferometric displacement measurement. And U.S. Pat. No. 6,316,779 by Tsai, also incorporated herewith by reference, teaches the use of phase sensitive detection for rotation and translation measurement. Phase sensitive detection is also highly useful with the inventive wavelength meter 10.

Figure 10:
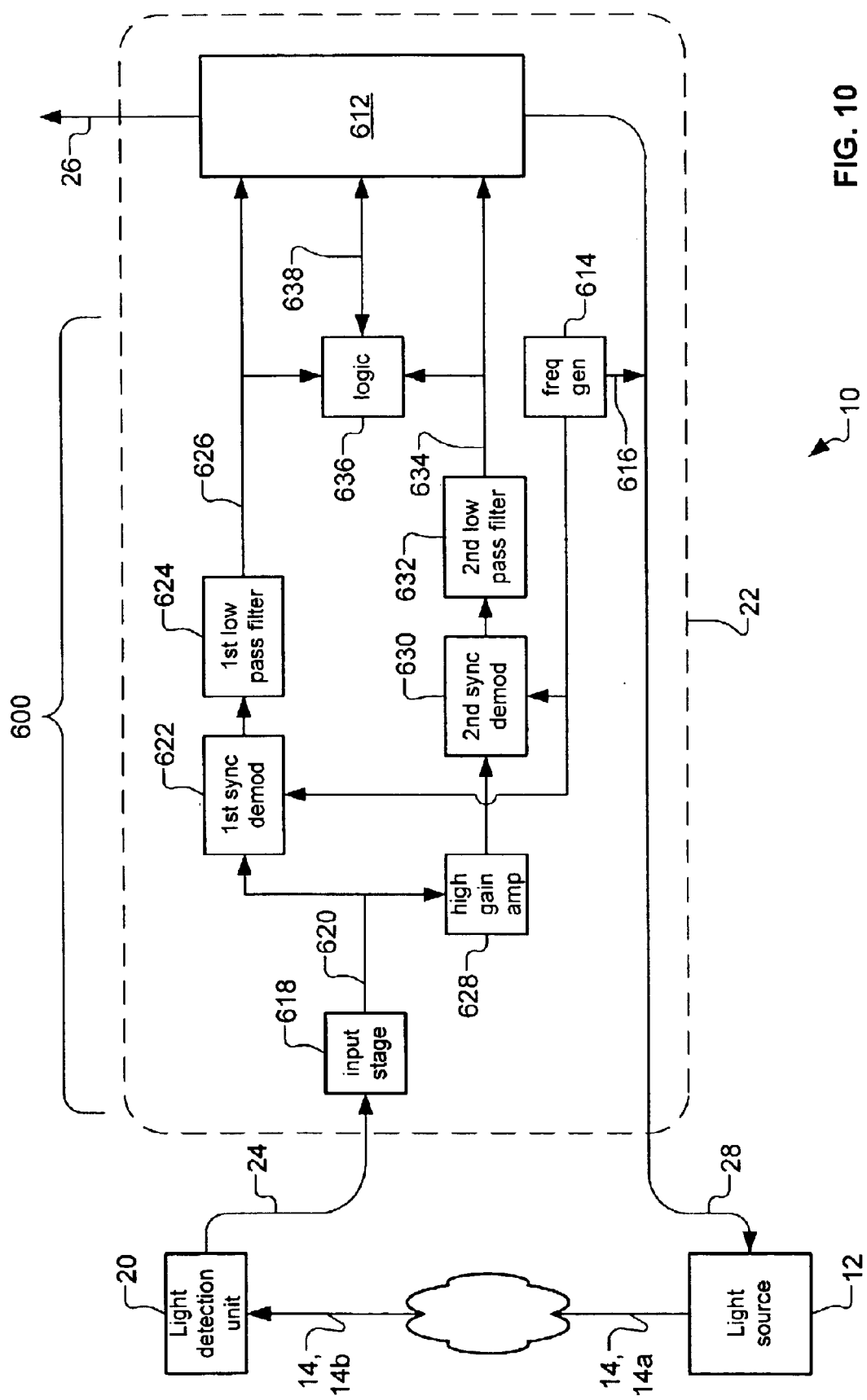
FIG. 10 is a block diagram depicting a system for phase sensitive detection applied in an embodiment of the present invention.

FIG. 10 is a block diagram depicting a system for phase sensitive detection applied with the present invention. A light source 12 produces a light beam 14 which is detected by a light detection unit 20. The light detection unit 20 communicates with a processor 22 via a detector link 24, and the processor 22 communicates with the light source 12 via a source link 28. To perform phase sensitive detection the processor 22 includes phase sub-process circuitry 600 in addition to basic processor circuitry 612, the latter being substantially the same as the processors 22, 170, 222 of FIG. 1a–b, 3, and 5 without phase sensitive detection.

A frequency generator 614 produces a modulation signal 616 which is communicated to the light source 12, as shown via the source link or by other means. This is used to modulate the light beam 14. The light detection unit 20 receives the so modulated light beams 14 and produces a raw signal, or signals if multiple sensors are used (e.g., a quad-cell type sensor will produce four raw signals and four electrical channels or multiplexing may then be used in straightforward manner). If the light detection unit 20 includes both an intensity sensitive detector and a position sensitive detector, phase sensitive detection may be employed with one or both.

The sensing elements in light detection unit 20 are typically direct current (DC) biased, and hence the raw signals each have both DC and alternating current (AC) signal elements at this early stage. Unfortunately, the DC element is subject to thermal and other types of drift, which is a particular weakness of many present detectors. The effects of such drift is desirably eliminated before high gain amplification is used in later signal processing. To do this, the raw signals are fed into an input stage 618 which couples only the AC elements. For only one or for an "unrelated" raw signal the input stage 618 may be a filter. If the raw signals are related, say, for instance, four signals from a quad-cell type sensor, the input stage 618 may include differential amplifiers. The input stage 618 produces a difference signal 620.

Once the difference signal 620 has the undesirable DC elements removed there are usually still undesirable AC elements also present. For example, room lighting may introduce such undesirable AC elements. If incandescent lighting is used in a measurement area it may introduce 60 hertz AC signal elements, and if fluorescent lighting is used it may introduce various higher frequency AC signal elements. Eliminating such undesirable AC elements is important also.

A sample of the difference signal 620 is processed by a first synchronous demodulator 622 and passed through a first low pass filter 624 to obtain a coarse signal 626. Since the first synchronous demodulator 622 operates directly on the low gain difference signal 620, high precision demodulation is not required here, and conventional analog switches and operational amplifiers may be used.

Another sample from the difference signal 620 is amplified with a high gain amplifier 628 to produce a highly amplified signal which is then processed by a second synchronous demodulator 630 and passed through a second low pass filter 632 to obtain a fine signal 634. The second synchronous demodulator 630 usually must be of high precision, due to the sensitive nature of the highly amplified signal.

In the inventor's preferred embodiment the second synchronous demodulator 630 and the second low pass filter 632 are combined in a board level, lock-in amplifier system which serves as a high quality balanced demodulator and a 6th order high quality filter. A suitable component for this is a "Lock-in Engine" which is commercially available from Quanta Physik, Inc. of Palm Beach Gardens, Fla., USA. ("The lock-in amplifier is basically a synchronous demodulator followed by a low pass filter . . . Lock-in amplification is a technique which is used to separate small, narrow band signal content from interfering noise. The lock-in amplifier acts as a detector and narrow band filter combined. Very small signals can be detected in the presence of large amounts of non-correlated noise when the frequency and phase of the desired signals are known." From AD630 Application Note by Analog Devices, Inc. of Norwood, Mass. Quanta Physik's Lock-in Engine is built around the AD630 component.)

The frequency, shape, and waveform detection point used may also be chosen to facilitate processing. For example, a 30 kilo Hertz modulation frequency, processing the signal as a trapezoidal wave, and detection at amplitude zero crossing points work well in the inventor's embodiments.

The coarse signal 626 and the fine signal 634 are provided to a logic unit 636, and optionally also directly to the basic processor circuitry 612. The powerfulness of the logic unit 636 used will typically depend considerably on the capabilities of the basic processor circuitry 612, and the logic unit 636 may even be omitted and its tasks instead performed in the basic processor circuitry 612.

If needed, a communications link 638 is provided between the logic unit 636 and the basic processor circuitry 612. This may be bi-directional, permitting the basic processor circuitry 612 to transmit instruction signals to the logic unit 636 directing when to perform processing.

In summary, phase sensitive detection works by deliberately applying a modulation to the light beam 14 and then using detection and processing to work with only the light which has that modulation. In this manner, error can be eliminated from the intensity or positional information that is determined from the light beam 14 and the accuracy of the inventive wavelength meter 10 still further improved.

Figure 11:
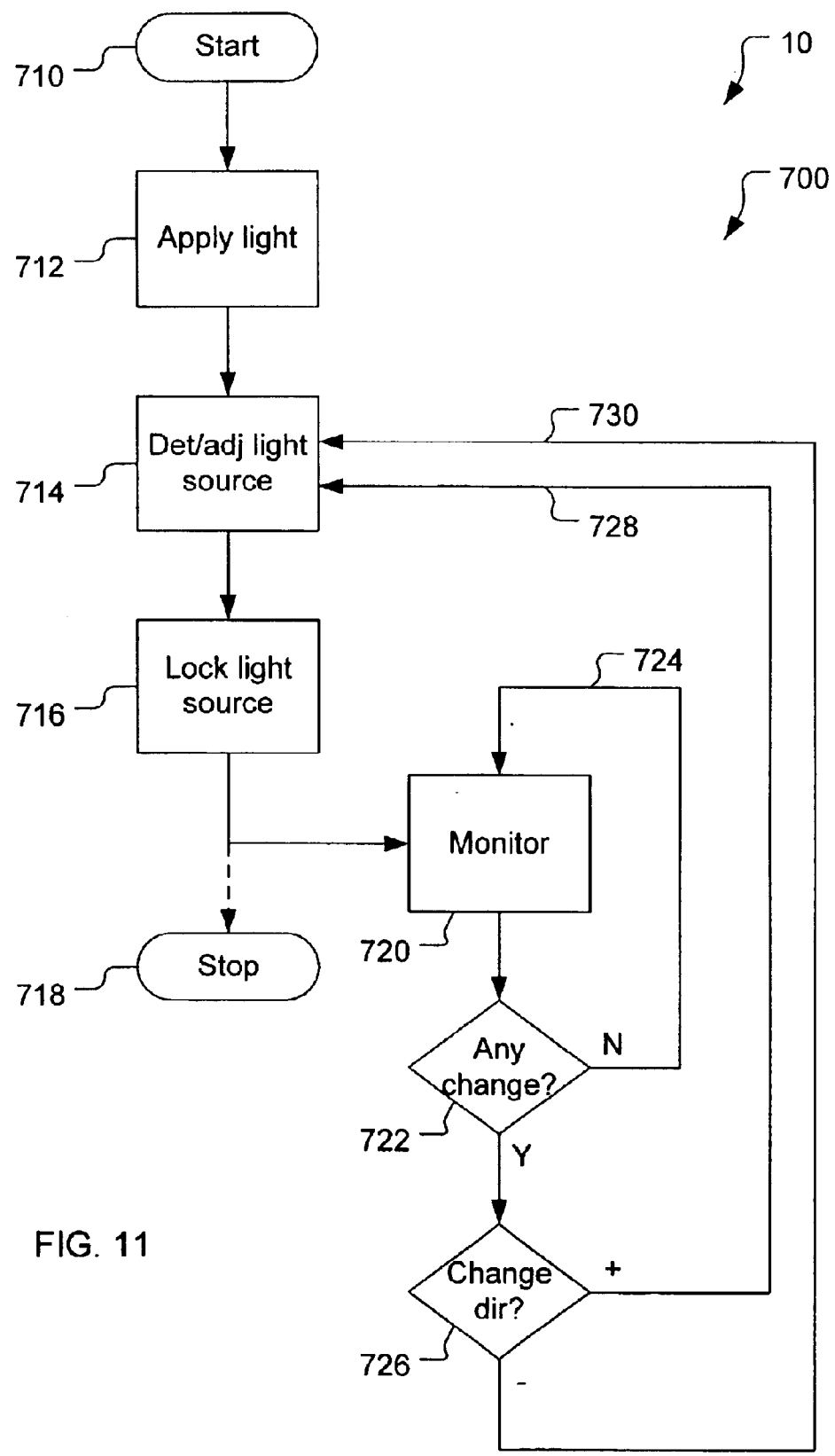
FIG. 11 is a flowchart of a process which the invention may employ to achieve frequency locking.

FIG. 11 is a flowchart of processes which the invention may employ to achieve frequency locking. A general frequency locking process 700 is shown, and variations are discussed below with the core process. Reference to FIG. 1a–b will also assist in following the discussion.

The frequency locking process 700 starts in a step 710. In a step 712, light is applied from the light source 12 to the inventive wavelength meter 10. In a step 714, the light is detected and adjusted as desired. This step 714 necessarily includes detecting the light beam 14 at the light detection unit 20 and controlling the light source 12. However, step 714 may operate differently on first use or in different embodiments of the wavelength meter 10.

When the wavelength meter 10 is first used, the light beam 14 presumably has a frequency close to that desired. The light detection unit 20, or at least an intensity sensitive element in it such as the intensity sensitive detector 220a in FIG. 5, will be set up so that the light diverted by the light diverter 16 produces maximum intensity when the desired light wavelength is present. If the light diverter 16 is itself controllable, such as the acousto-optical unit 416 of FIG. 8, it will also be set-up to cause this. In step 714 the wavelength meter 10 controllably adjusts the light source 12 to reduce and to increase the light frequency until the "closest" maximum intensity is determined. This will be the desired principal maximum (see FIG. 2 generally for a review of the principles involved). Over adjustment of the light source 12 may result in "seeing" different maximums. Accordingly, the light frequency is both reduced and increased, and the minimum adjustment of the light source 12 is used.

In a step 716 the processor 22 of the wavelength meter 10 adjusts the light source 12 as was determined proper in step 714. If the light source 12 has internal capability to lock parameters which control its frequency, the processor 22 can now request that it do this. Alternately, the processor 22 can continuously direct the light source 12 as needed.

If all that is needed is a one-time frequency setting, the frequency locking process 700 may stop in a step 718. Typically, however, ongoing frequency locking will be desired. A step 720 then follows. It monitors the light frequency to ensure ongoing correct locking. In step 720 the processor 22, or an external system working with it, stores information received from the light detection unit 20 for use in comparison over time.

In a step 722 it is determined whether any change has occurred. Depending on the nature and the use of the light detection unit 20, a change can be determined in a variety of ways. For example, a decrease in light intensity, by movement of the principal maximum, may indicate either upward or downward frequency drift. An increase in light intensity may also occur, say, due to a change in voltage at the light source 12. Changes in which light intensity increases may be accompanied by a frequency change, so these are also potentially important. The light detection unit 20 may also detect a positional change, using an element for that like the position sensitive detector 220b in FIG. 5, or an integrated unit, such as a quad-photocell, may detect both intensity and position changes. The point here is not to enumerate all possible change scenarios, but rather that any change may make frequency checking desirable.

If a change has not occurred, a path 724 may be followed and step 720 can be repeated to continuing monitoring. Alternately, the processor 22 (or external system) can periodically direct that path 724 not be followed, i.e., to act as if a change has occurred and force a scenario which will cause the frequency locking process 700 to return to step 714.

If a change has occurred, however, alternate procedures can be used, depending on choice and the options of the particular embodiment of the wavelength meter 10 being employed. In a simple approach, a change (or a decision to proceed as if there was one) can have the frequency locking process 700 go from step 722 directly back to step 714. FIG. 11 shows a more sophisticated approach. In a step 726 the nature of the change is determined, using a position sensitive element, and alternate paths 728 and 730 lead back to step 714. Now, however, the wavelength meter 10 will know which way adjustment is required, based on whether it is driven by path 728 (due to an upward drift in frequency, requiring a downward adjustment) or by path 730 (due to downward drift, requiring an upward adjustment). This approach has two particular benefits. First, by eliminating the need to try both upward and downward adjustment, it hastens adjustment, thus permitting the light beam to be locked back at the desired frequency in minimum time. Second, by eliminating the need to try both upward and downward adjustment, it insures that the frequency of the light beam 14 will not temporarily be wrongly adjusted even further away from that desired while "wrong direction" testing occurs. For example, if the frequency of the light beam 14 has drifted lower than desired, it may be highly undesirable in the processes employing the light beam 14 to adjust it still lower as part of an "is lower or higher needed" type test.

Those skilled in the art will readily appreciate that FIG. 11 and the above discussion do not encompass all possible variations on the frequency locking process 700. Rather, this describes the inventor's preferred basic approaches to employing the inventive wavelength meter 10. Equivalent and alternate steps or series of steps may be employed in variations of the frequency locking process 700, and vary likely will be in applications of the invention in specialized laboratory and industrial tasks.

With reference again to FIGS. 1a–b, the light detection unit 20 may be a conventional position sensitive detector (e.g., the PSD 120, 168 of FIGS. 2–3), but this is not a requirement. The inventor has found other approaches that are adequate or even preferable. Using these, a single intensity detecting photodiode may be used in the light detection unit 20. Of course, multi-cell detectors, including bi-cell, arrays, and even quad-cell detectors can still be used.

Figure 12:
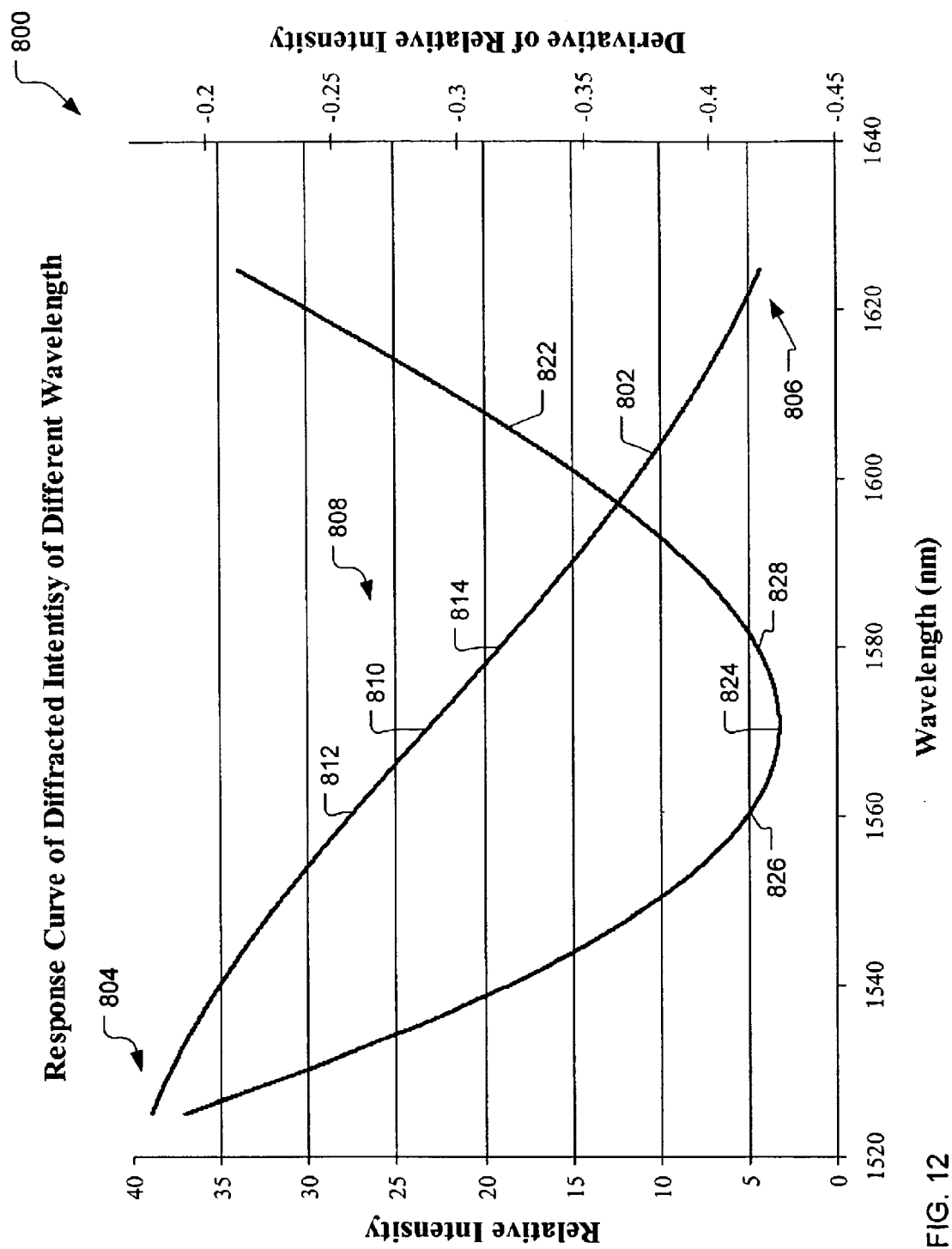
FIG. 12 is a graph with a first trace depicting relative light intensity verses wavelength and a second trace depicting the first derivative of the relative intensity verses the wavelength.

FIG. 12 is a graph 800 in which a first trace 802 depicts relative light intensity verses wavelength in the beam portion 14b, 14c after the light diverter 16 when using a given set of dimensions in the wavelength meter 10. For the immediately following discussion we treat actual and relative light intensity as the same. In some embodiments this may effectively be the case, or at least so to an extent adequate for the application at hand. For example, a highly stabilized light source 12 may be used. The inventor has also, however, devised a way to avoid the problem that light intensity can and often does vary and that solution is discussed presently.

With continued reference to FIG. 12, the changes in light intensity corresponding to a peak region 804 and a trough region 806 are small, and working with them may be awkward. The wavelength meter 10 can easily be designed to avoid this by deliberately constructing it so that anticipated wavelengths correspond with a central region 808 of the graph 800.

Let us consider an example in the central region 808. The wavelength meter 10 may be constructed so that the light detection unit 20 measures a relative intensity value of 23.39, corresponding with a wavelength of 1570 nm (point 810). If the measured relative intensity changes to 27.61 one knows that the wavelength has changed to 1560 nm (point 812). Similarly, if the measured value is 19.14 one knows that wavelength present is 1580 nm (point 814).

Figures 13A, 13B:
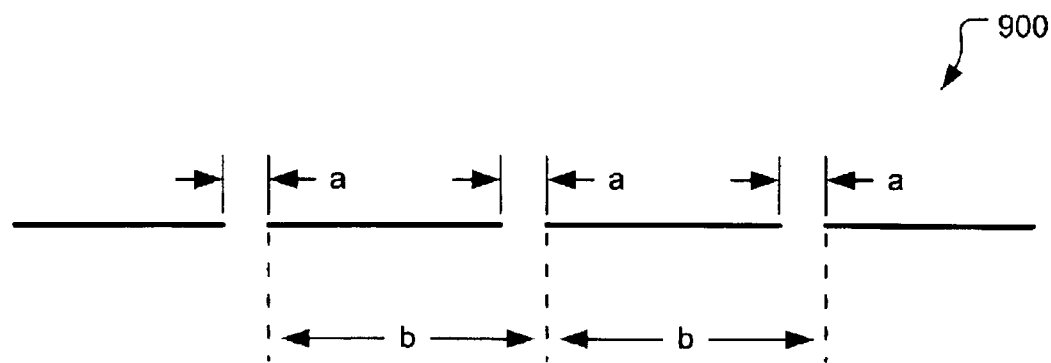

As noted, constructing the wavelength meter 10 to achieve a desired intensity/wavelength relationship is a matter of design. FIG. 13a is a cross section view of a slit plate 900, such as the slit plate 316 of FIG. 7, but with more detail shown. The slit plate 900 here has a plurality of slits 902, typically many and perhaps even thousands. To optimize the slit plate 900 for work with a particular wavelength, λ, the slits 902 desirably all have equal width, are equidistantly separated, and are all parallel. FIG. 13b is a formula 950 that describes the relationships present in the slit plate 900, and thus shows how it can be designed to produce the graph 800 in FIG. 12. In the formula 950, the width of the slits 902 is represented by a, the separation is represented by b, and the number present is represented by N. The intensity at the central maximum is $I_0$ and the intensity for an actual wavelength present is I (the use of $I/I_0$ provides the useful relative indication employed here).

Extending these design principles to other types of the light diverter 16 is straight forward. For instance, those skilled in the art will readily appreciate that the case for the slit plate 900 and the formula 950 are directly analogous to the case for a ruled diffraction grating.

Figure 14A:
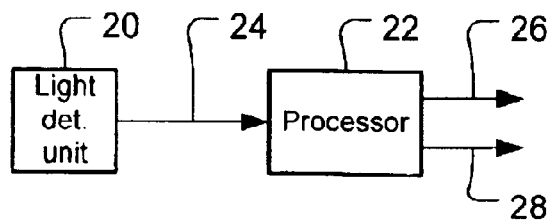

FIGS. 14a–d are block diagrams depicting processing architectures which the wavelength meter 10 may employ. FIG. 14a depicts an analog embodiment 960 of the wavelength meter 10. The light detection unit 20 here receives a portion of the light beam 14 and a signal is then created and communicated to the processor 22, via the detector link 24. In its simplest form, the signal here is an analog one and the processor 22 is an analog type able to handle it. Analog processors are little used today, but the scope of the present invention encompasses even such "older" technology.

Figure 14B:
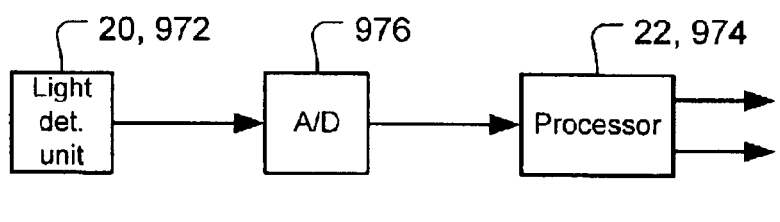

FIG. 14b depicts a digital embodiment 970 of the wavelength meter 10, using more typical digital principles today. The light detection unit 20 includes a sensor 972 and the processor 22 includes a digital computing unit 974. An analog to digital converter (A/D converter 976) is also provided. The A/D converter 976 may be integrated into the light detection unit 20, or it may be a stand alone component that is distinct from both the light detection unit 20 and the processor 22, or the AID converter 976 may be integrated into the processor 22.

Figure 14C:
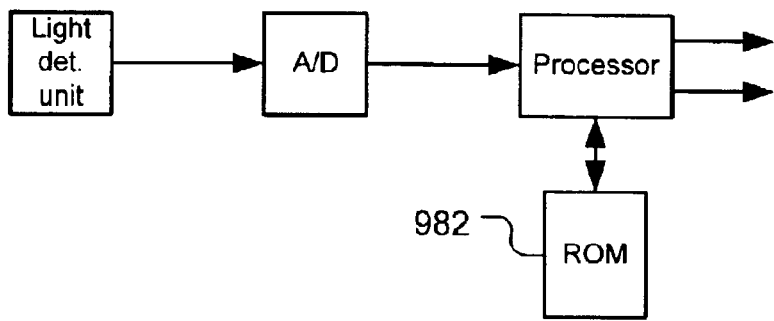
Figure 14D:
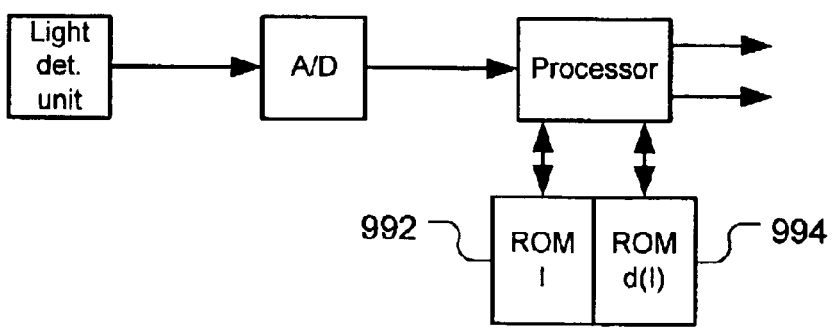

FIG. 14c depicts a single-ROM embodiment 980 of the wavelength meter 10, one resembling the digital embodiment 970 but having a memory unit 982 added. The memory unit 982 may particularly be a read only memory (ROM), but that is not a requirement. FIG. 14d depicts a dual-ROM embodiment 990, resembling the embodiments 970, 980 but having a first memory unit 992 and a second memory unit 994. The memory units 992, 994 also may particularly be ROM types, but that again is not required.

The embodiments 960, 970, 980, 990 in FIG. 14a–d provide the processing sophistication needed in the different variations of the invention. That processing can, however, take many forms, as is now described.

The relationship depicted by the graph 800 can be employed programmatically by the processor 22. The embodiments 960, 970 in FIGS. 14a–b use such programmatic processing and particular factors to consider here are the processor cost and speed. A considerable increase in processing power may be had today for relatively little cost increase, so this generally will not be a critical factor in most embodiments of the inventive wavelength meter 10. Programmatically processing the intensity data in a timely enough manner is another matter, however, and providing adequate processor speed for some applications can be a serious challenge.

One way to increase processing speed is to replace the actual mathematical relationship used with an approximated one, i.e., to use a simpler formula. Taking this to a logical end, it should be observed in FIG. 12 that the central region 808 of the first trace 802 of the graph 800 somewhat resembles a sloping straight line. The formula of a line may thus be used, although there will clearly be some loss in accuracy when this is done, and that loss will become more acute when the light intensities encountered are in the peak region 804 or the trough region 806.

The inventor has, however, found another approach that is fast, highly accurate, and economical. The embodiments 980, 990 in FIGS. 14c–d are variations of the wavelength meter 10 using this approach: table look-up supplemented processing. Look up tables have long been known and are widely used today in the general electronic arts, but not to the inventor's knowledge in any wavelength or frequency measuring or locking schemes. Prior art approaches here have instead relied upon analog processing or on counting detected interference fringes and then digitally processing the counts.

First considering the single-ROM embodiment 980 of the wavelength meter 10 in FIG. 14c, the first memory unit 992 there stores pre-calculated wavelength values in an "address space" based on intensity. As noted above, in many embodiments the data received via the detector link 24 will undergo analog to digital conversion. Once a measured intensity value is in digital format it is usable by the processor 22 to look up and retrieve a corresponding wavelength value in the table of values stored for this purpose in the first memory unit 992. The look up process for this can directly use the digital intensity value as an address or it can convert that into an actual address in the first memory unit 992. For instance, every possible digital intensity value can address a pre-stored corresponding wavelength value. In this case, the address space and the capacity of the first memory unit 992 may be large, but memory is a relatively inexpensive component today. Alternately, some manner of limiting the address space can be used. For example, the digital intensity values can be limited to only a set range, which is mapped in the first memory unit 992 (i.e., bounded), or they can be low-value-bit truncated and then used, etc. (i.e., resolution limited).

In sum, the single-ROM embodiment 980 of the wavelength meter 10 does not require much processing capability, since the bulk of processing in this approach is performed elsewhere, beforehand, with the results of that stored in the first memory unit 992 for later use. With processing reduced or even avoided entirely in this manner, the single-ROM embodiment 980 can be very fast as well as economical.

Next considering FIG. 14d and the dual-ROM embodiment 990 of the wavelength meter 10 there, this variation takes the use of table look-up supplemented processing to anther level. Here the first memory unit 992 again stores wavelength values in an address space based on intensity, similar to the single-ROM embodiment 980 of FIG. 14c. However, The added second memory unit 994 additionally stores wavelength values in an address space based on the first derivative of light intensity.

With reference again to FIG. 12, we now take up how one can measure relative intensity with as little as a single intensity detecting cell. Working with relative or normalized intensity is highly desirable because variation in the actual light intensity is fairly common in real-world practice. In the light sources 12 (FIGS. 1a–b) temperature changes, vibration, aging, etc. can all change the intensity of the light beams 14 produced. Intensity attenuation can also occur in the light diverters 16 and light divergers 18. Thus, if the graph 800 and the first trace 802 in FIG. 12 instead depicted actual intensity, variations in that intensity would raise or lower the first trace 802 and, for example, a change in measured value from 24 to 27.5 might signify a wavelength change, an intensity change, or a combination of both.

FIG. 12, however, depicts relative intensity and it further includes a second trace 822 depicting the first derivative of relative intensity verses the wavelength. The first derivative values represented with the second trace 822 are useful, alone or in combination with the values of relative intensity corresponding with the first trace 802. In particular, its slope is useful. For example, even though the actual light intensity may change appreciably, the slopes at the points on the second trace 822 corresponding with 1570 nm (point 824), 1560 nm (point 826), and 1580 nm (point 828) will not change.

Figure 15A:
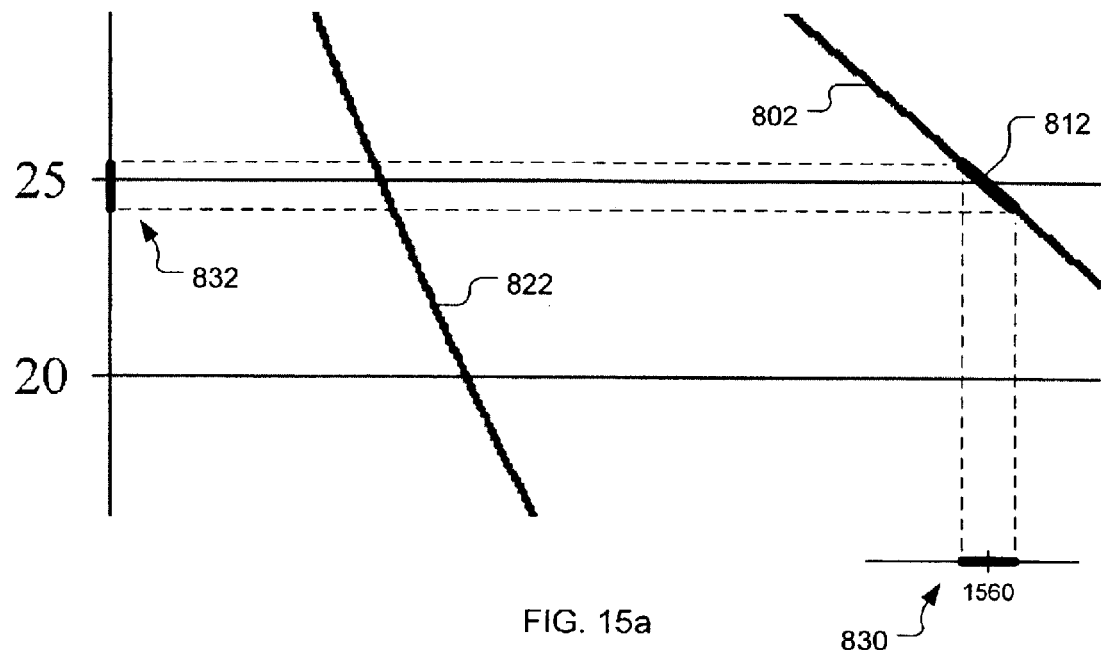
FIGS. 15a–b are expanded sub-portions of the graph in FIG. 12, wherein FIG. 15a further depicts wavelength change within a range with respect to relative light intensity and FIG. 15b further depicts wavelength change within a range with respect to the first derivative of the relative intensity.

FIG. 15a is an expanded sub-portion of the graph in FIG. 12 that particularly depicts the point 812 on the first trace 802. As can be seen in the figure, which is stylized for emphasis, point 812 may more closely resemble a line corresponding with a wavelength range 830. For example, inherent or intentionally introduced noise can produce such a wavelength range 830 over some period of time. Alternately, the wavelength range 830 can coincide with a modulation bandwidth if the light beam portion 14b, 14c is carrying information. In particular, however, the extent of such a wavelength range 830 will generally be constant, even though the range as a whole can drift higher or lower, just as the wavelength of the beam portion 14b, 14c (FIGS. 1a–b) does. The constant nature of the wavelength range 830 extent, in combination with the relationships present by design in the inventive wavelength meter 10, also define a relative light intensity range 832.

From this it follows that the invention may measure the relative light intensity range 832 and work backwards. For instance, if the light intensity is measured across some period of time as having a lowest value of 26.78 and a highest value of 28.43, and if the wavelength range 830 is known to be 4 nm, it is a simple exercise, in principal, to calculate the location of point 812, and thus to determine that the wavelength actually corresponding with it is 1560 nm. The utility of this approach is somewhat limited, however, because the relative light intensity range 832 will vary just as the actual light intensity can an often does.

Figure 15B:
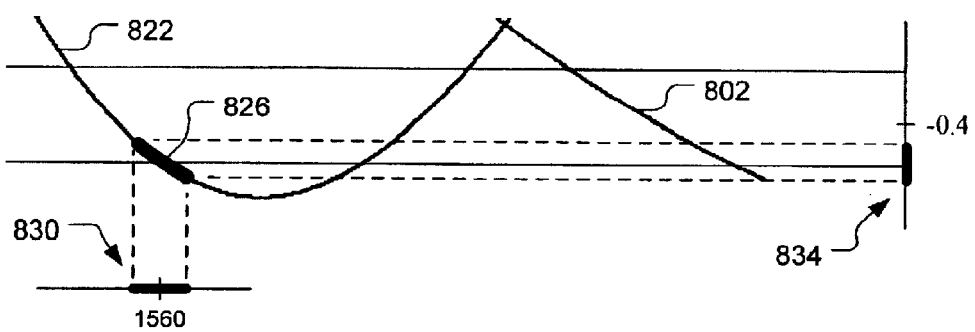

FIG. 15b is an expanded sub-portion of the graph in FIG. 12 that particularly depicts the point 826 on the second trace 822, representing the first derivative of relative light intensity. As can be seen in this figure, also stylized for emphasis, the point 826 may also resemble a line also corresponding with the wavelength range 830. By virtue of the constant nature of the wavelength range 830 extent and the relationships present in the inventive wavelength meter 10, a first derivative intensity range 834 is also defined.

Thus, a further useful aspect of the invention is to measure the relative light intensity range 832, to determine the first derivative intensity range 834, and to then work backwards. For instance, if the first derivative intensity range 834 has a end values of −0.4088 and −0.4186, and if the wavelength range 830 is again known to be 4 nm, it is a simple exercise to calculate the slope about the point 812 and from this determine that the wavelength (or, more correctly the center wavelengths) actually present is 1560 nm. For instance, the slope about point 826, is quite distinct from the slopes about point 824 and point 828. This approach therefore overcomes the limitation noted above, since the slopes about the points in the second trace 822 are not effected by changes in the actual intensity of the light in the beam portion 14b, 14c.

Before concluding this discussion, let us consider an application which the industry has found particularly problematical: recalibration during continuous operation of an underlying application. Optical telecommunications service providers, for example, prefer not to interrupt their services to customers while recalibrating. Unfortunately, the prior art techniques available for drift correction generally do not permit continued operation because they tend to undermine the underlying applications. This is because, when the direction of drift is not known, simple probability dictates that any first attempt at correction will be in the wrong direction half of the time, exacerbating its effects until the wrong-ward adjustment is detected and corrected for.

The inventive wavelength meter 10 permits continuous operation. The Fabry-Perot interferometer embodiment 200 depicted in FIG. 5 and its two detectors 220a, 220b addresses this very problem. The dual-ROM embodiment 990 in FIG. 14d, however, particularly handles continued operation well. Its use of two memory units 992, 994, storing both intensity value addressed wavelength data and also first derivative wavelength data, permits the processor 22 to easily determine the magnitude and direction of drift even if the light detection unit 20 uses only a single-cell photodiode. Furthermore, the extent of the wavelength range 830 used for this can be defined by the modulation bandwidth of the information the light beam portion 14b, 14c is carrying, thus using an underlying application characteristic to facilitate recalibrating during system operation and insuring that only right-ward adjustment is ever used.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present wavelength meter 10 is well suited for application in light measurement and control in laboratories and in many industries. One such industry, telecommunications has been briefly noted above, but it is a straight forward matter for those skilled in the art to apply the present invention in other fields as well. The invention employs a single-pass approach yet provides accuracy, verses the prior art which has relied on double-pass or even more complex arrangements.

The single-pass approach provides both functional and economic benefits. Its simplicity eliminates a number of complexity-driven disadvantages, often present in prior art systems. The wavelength meter 10 requires no moving parts and what parts it does employ are considerably less susceptible to problems of misalignment and alignment change, e.g., temperature or vibration induced change, which are common problems in optical systems. A single-pass approach also minimizes undesired refraction and reflection due to numerically fewer components or effective components being "seen" by light beams being worked with.

The single-pass approach and the overall simplicity of the invention, generally, also provide economy. The most critical component typically will be the light diverter 16. But this can be a simple multiple slit unit, and quite inexpensively manufactured. Or the light diverter 16 can be a basic, flat diffraction grating. Curved diffraction gratings can also be used but such inherently distort the diverted portions of light beams in a manner difficult or, in some applications even impossible, to correct. Curved diffraction gratings are also quite expensive and generally avoided, finding application rarely outside of laboratory settings where cost is immaterial. The element used as the light diverter 16 can also perform multiple-roles, e.g., using the F-P interferometer 216 for bandwidth narrowing or using the acousto-optical unit 416 for concurrent light diverging.

The processor 22 may also employ a number of sophisticated advances over the prior art. As has been discussed, it may be work with signals from the light detection unit 20 in either analog or digital format. In particular, however, its use on look up tables containing pre-stored data permit simplifying the light detection unit 20, reducing the overall cost of the wavelength meter 10 and applications using it, increasing the speed and accuracy of the wavelength meter 10, and permitting use of the wavelength meter 10 concurrent with applications using it.

Yet even with all of the benefits which the inventive wavelength meter 10 provides, it uses generally well known optical and electrical components and principles, and those skilled in the art should be able to readily construct and apply embodiments once the teachings herein are grasped. The invention may be used to meter and control a single wavelength or multiple ones concurrently. The invention can be employed with integrated or external systems to analyze a wavelength relationship or relationships with respect to time or other factors, and the invention can particularly be employed to provide feedback to bring a light source to a particular wavelength or frequency or to correct for drift.

For the above, and other, reasons, it is expected that the wavelength meter 10 of the present invention will have widespread industrial applicability. Therefore, it is expected that the commercial utility of the present invention will be extensive and long lasting.

What is claimed is:

1. Apparatus for measuring the wavelength of light present in a light beam, comprising:
    a light diverter able to receive the light beam as a first beam portion and provide there from a second beam portion having a transverse displacement characteristic, wherein said transverse displacement characteristic is representative of the wavelength of the light present in the light beam and the light beam makes only a single-pass with respect to said light diverter;
    a light detection unit able to receive said second beam portion, to detect said transverse displacement characteristic there in and to provide a raw signal based there on, wherein said raw signal includes at least one intensity value based on said transverse displacement characteristic; and
    a processor able to receive said raw signal including said at least one intensity value and determine the wavelength of light present in the light beam there from.

2. The apparatus of claim 1, wherein said processor programmatically determines the wavelength of light present in the light beam based on said at least one intensity value.

3. The apparatus of claim 2, wherein said processor employs a formula for an actual intensity-wavelength relationship.

4. The apparatus of claim 3, wherein:
    said light diverter includes a member of the set consisting of gratings having a plurality of rulings and-plates having a plurality of slits; and
    said formula is based on $I/I_0 = ((\sin a)/a)^2 * ((\sin Nb)/(\sin b))^2$ wherein $I/I_0$ is the relative intensity of light present in the light beam, a is the width of said ruling or said slits, N is the number of said rulings or said slits, and b is the separation of said rulings or said slits.

5. The apparatus of claim 2, wherein said processor employs a formula for an approximated intensity-wavelength relationship.

6. The apparatus of claim 1, further comprising:
    a table containing a plurality of pre-stored values; and
    said processor determines the wavelength of light present in the light beam by looking up at least one said pre-stored value in said table based on said at least one intensity value.

7. The apparatus of claim 6, wherein:
said plurality of values in said table correspond with a range of possible instances of said at least one intensity value; and
said processor determines the wavelength of light present in the light beam by using said at least one intensity value to addresses at least one said value in said table.

8. The apparatus of claim 1, further comprising:
a first table containing a plurality of pre-stored first values, wherein said first values are representative of possible instances of the intensity of light present in the light beam;
a second table containing a plurality of pre-stored second values, wherein said second values are representative of the first derivatives of said possible instances of the intensity of light present in the light beam; and
said processor determines the wavelength of light present in the light beam based on looking up at least one said first value in said first table and at least one said second value in said second table.

9. The apparatus of claim 8, wherein:
said plurality of first values in said first table and said plurality of second values in said second table both correspond with a range of possible instances of said at least one intensity value; and
said processor determines the wavelength of light present in the light beam by using said at least one intensity value to address at least one said first value in said first table and at least one said second value in said second table.

10. The apparatus of claim 1, wherein the wavelength of light present in the light beam is within a wavelength range having a known extent and said processor employs said known extent when determining the wavelength of light present in the light beam.

11. The apparatus of claim 1, further comprising a communications link, wherein said processor is further able to communicate the wavelength of light present in the light beam to an external system via said communications link.

12. The apparatus of claim 1, further comprising a communications link, and wherein:
said light beam is generated by a controllable light source; and
said processor is able to communicate with said controllable light source via said communications link, thereby permitting said controllable light source to control the wavelength of the light beam.

13. The apparatus of claim 1, wherein said light diverter includes a member of the set consisting of diffraction gratings, Fabry-Perot interferometers, multiple slit plates, and acousto-optical units.

14. The apparatus of claim 1, wherein said light detection unit includes a member of the set consisting of photodiodes, photodiode arrays, bi-cells, and quad-cells.

15. The apparatus of claim 1, wherein said light detection unit detects said transverse displacement characteristic using a single photocell device.

16. The apparatus of claim 1, further comprising a light diverger.

17. The apparatus of claim 16, wherein said light diverger includes at least one member of the set consisting of concave lenses and curved mirrored surfaces.

18. A method for measuring the wavelength of light present in a light beam, comprising the steps of:

(a) diverting a portion of the light beam by imparting to it a transverse displacement characteristic that is representative of the wavelength of the light present in the light beam;

(b) detecting said transverse displacement characteristic and creating a signal including at least one intensity value based on said transverse displacement characteristic; and (c) determining the wavelength of the light present in the light beam based on said at least one intensity value in said signal.

19. The method of claim 18, wherein said step (c) includes programmatically calculating the wavelength of light present in the light beam based on said at least one intensity value.

20. The method of claim 19, wherein said step (c) includes employing a formula for an actual intensity-wavelength relationship when programmatically calculating the wavelength of light present in the light beam.

21. The method of claim 20, wherein:
said step (a) includes diverting said portion of the light beam with a member of the set consisting of gratings having a plurality of rulings and plates having a plurality of slits; and
said formula is based on $I/I_0 = ((\sin a)/a)^2 * ((\sin Nb)/(\sin b))^2$ wherein $I/I_0$ is the relative intensity of light present in the light beam, a is the width of said ruling or said slits, N is the number of said rulings or said slits, and b is the separation of said rulings or said slits.

22. The method of claim 19, wherein said step (c) includes employing a formula for an approximated intensity-wavelength relationship when programmatically calculating the wavelength of light present in the light beam.

23. The method of claim 18, wherein said step (c) includes looking up at least one stored value in a table based on said at least one intensity value, wherein said table contains a pre-stored plurality of said stored values.

24. The method of claim 23, wherein:
said plurality of said stored values in said table correspond with a range of possible instances of said at least one intensity value; and
said step (c) includes addressibly retrieving at least one said stored value from said table based on said at least one intensity value.

25. The method of claim 18, wherein said step (c) includes:
looking up at least one first stored value in a first table containing a plurality of said first stored values that are representative of possible instances of the intensity of light present in the light beam; and
looking up at least one second stored value in a second table containing a plurality of said second stored values that are representative of the first derivatives of said possible instances of the intensity of light present in the light beam.

26. The method of claim 25, wherein:
said plurality of said first stored values in said first table and said plurality of said second stored values in said second table both correspond with a range of possible instances of said at least one intensity value; and
said step (c) includes addressibly retrieving at least one said first stored value from said first table and at least one said second stored value from said second table based on said at least one intensity value.

27. The method of claim 18, wherein the wavelength of light present in the light beam is within a wavelength range and the method further comprises:

determining the extent of said wavelength range; and employing said extent in said step (c) when determining the wavelength of light present in the light beam.

28. The method of claim 18, further comprising communicating the wavelength of the light present in the light beam to an external system.

29. The method of claim 18, wherein the light beam is generated by a controllable light source and the method further comprising communicating with said controllable light source to control the wavelength of the light beam.

30. The method of claim 18, wherein the light beam is generated by a modulatible light source and the method further comprises:

modulating the light beam; and employing phase sensitive detection when creating said signal including said at least one intensity value.

31. The method of claim 18, further comprising, prior to said step (a), directing said portion of the light beam to present it for use in said step (a).

32. The method of claim 18, further comprising, prior to said step (a), tailoring said portion of the light beam to change it for use in subsequent said steps.

33. The method of claim 18, wherein said step (b) includes detecting said transverse displacement characteristic using a single photocell device.

34. The method of claim 18, further comprising, subsequent to said step (a) and prior to said step (b), diverging said portion of the light beam.

* * * * *